(12) United States Patent
Kang et al.

(10) Patent No.: US 11,491,875 B2
(45) Date of Patent: Nov. 8, 2022

(54) DISPLAY DEVICE FOR VEHICLE

(71) Applicant: LG ELECTRONICS INC., Seoul (KR)

(72) Inventors: Seung Mo Kang, Seoul (KR); Sang-Hyeun Son, Incheon (KR); In Koo Shim, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 337 days.

(21) Appl. No.: 16/842,996

(22) Filed: Apr. 8, 2020

(65) Prior Publication Data

US 2021/0213831 A1    Jul. 15, 2021

(30) Foreign Application Priority Data

Jan. 10, 2020 (KR) .................. 10-2020-0003553

(51) Int. Cl.
*B60K 37/02* (2006.01)
*G09F 9/30* (2006.01)
(Continued)

(52) U.S. Cl.
CPC .............. *B60K 37/02* (2013.01); *G09F 9/301* (2013.01); *B60K 35/00* (2013.01); *B60K 37/04* (2013.01);
(Continued)

(58) Field of Classification Search
CPC ............ B60K 37/02; B60K 2370/1533; B60K 2370/67; B60K 37/04; B60K 37/06;
(Continued)

(56) References Cited

U.S. PATENT DOCUMENTS 10,439,154 B2    10/2019  Kim et al.
2012/0268665 A1*  10/2012  Yetukuri ............... B60N 2/879
                                                     348/837
(Continued)

FOREIGN PATENT DOCUMENTS

EP        3088986       2/2016
JP       H05027330      2/1993
(Continued)

OTHER PUBLICATIONS

Notice of Allowance in European Appln. No. 20164227.9, dated Apr. 14, 2022, 7 pages.
(Continued)

*Primary Examiner* — Douglas M Wilson
(74) *Attorney, Agent, or Firm* — Fish & Richardson P.C.

(57) ABSTRACT

A display device for a vehicle includes a first frame, a second frame configured to move along a first direction with respect to the first frame, a first roller spaced apart from the first frame, a second roller rotatably coupled to the second frame and configured to move along the first direction based on movement of the second frame with respect to the first frame, and a flexible display that is at least partially wound around the second roller, that is configured to be bent around the second roller, and that has an end portion fixed to the first frame. A front surface of the flexible display defines an externally exposed area that is configured to increase based on an increase of a distance between the first roller and the second roller.

16 Claims, 15 Drawing Sheets

(51) Int. Cl.
| | | |
|---|---|---|
| *F16H 7/06* | (2006.01) | |
| *F16H 19/04* | (2006.01) | |
| *B60R 11/02* | (2006.01) | |
| *G06F 1/16* | (2006.01) | |
| *B60R 11/00* | (2006.01) | |
| *B60K 37/04* | (2006.01) | |
| *B60K 35/00* | (2006.01) | |
| *G09F 21/04* | (2006.01) | |

(52) U.S. Cl.
CPC .. *B60K 2370/1533* (2019.05); *B60K 2370/67* (2019.05); *B60K 2370/816* (2019.05); *B60R 11/0235* (2013.01); *B60R 2011/0005* (2013.01); *B60R 2011/0057* (2013.01); *B60R 2011/0084* (2013.01); *B60Y 2400/3012* (2013.01); *F16H 7/06* (2013.01); *F16H 19/04* (2013.01); *G06F 1/1601* (2013.01); *G06F 1/1652* (2013.01); *G09F 21/049* (2020.05)

(58) Field of Classification Search
CPC ............... B60K 35/00; B60K 2370/52; B60K 2370/816; G09F 9/301; G09F 27/005; G09F 21/049; G06F 1/1601; G06F 1/1652; B60Q 9/00; B60R 11/0229; B60R 16/02; B60R 16/023; B60R 11/0235; B60R 2011/0005; B60R 2011/0057; B60R 2011/0084; B60R 2011/0085; F16H 7/06; F16H 19/04; B60Y 2400/3012
See application file for complete search history.

(56) References Cited

U.S. PATENT DOCUMENTS

| | | | |
|---|---|---|---|
| 2017/0168769 A1 | 6/2017 | Jeon et al. | |
| 2019/0384438 A1* | 12/2019 | Park | G06F 3/0482 |
| 2020/0033913 A1* | 1/2020 | Yang | G06F 1/1624 |
| 2021/0014982 A1* | 1/2021 | Bok | H01L 27/322 |
| 2021/0103314 A1* | 4/2021 | Ko | G06F 3/04817 |
| 2021/0181800 A1* | 6/2021 | Ko | G06F 1/1652 |

FOREIGN PATENT DOCUMENTS

| | | |
|---|---|---|
| JP | 2001180390 | 7/2001 |
| JP | 2015152816 | 8/2015 |
| JP | 2019120893 | 7/2019 |
| WO | WO2020122453 | 6/2020 |

OTHER PUBLICATIONS

Extended European Search Report in European Appln. No. 20164227.9, dated Oct. 19, 2020, 7 pages.

Office Action in Korean Appln. No. 10-2020-0003553, dated Jun. 14, 2021, 17 pages (with English translation).

\* cited by examiner

DISPLAY DEVICE FOR VEHICLE

CROSS-REFERENCE TO RELATED APPLICATION

Pursuant to 35 U.S.C. § 119(a), this application claims the benefit of an earlier filing date of and the right of priority to Korean Application No. 10-2020-0003553, filed on Jan. 10, 2020, the contents of which are incorporated by reference herein in their entirety.

TECHNICAL FIELD

The present disclosure relates to a display device for a vehicle, and more particularly, to a display device including a flexible display.

BACKGROUND

Flexible displays may be bendable while displaying image information and may be applied to foldable-type devices.

In some examples, a flexible display may have a folding structure in which a size of a screen to be displayed may be conveniently modified, an installation space may be saved, a portability may be increased, and a large size display may be implemented.

In some examples, a flexible display may include rollable or bendable devices having a structure in which the display may be wound. For instance, the flexible display may be wound to reduce a size or an area of the entire display, and may be unwound to increase the size or the area of the entire display.

A vehicle dashboard may include a display device which may provide convenience to a user such as a driver to assist in safe driving of the vehicle. For example, the display device on the vehicle dashboard may display information about the driving of the vehicle and other devices of the vehicle.

SUMMARY

The present disclosure describes a display device for a vehicle, which includes a flexible display.

The present disclosure also describes a display device for a vehicle in which a screen size of a flexible display can be conveniently adjusted.

Aspects are not limited to the aspects described above, and other aspects that are not stated herein will be clearly understood by those skilled in the art from the following description.

According to one aspect of the subject matter described in this application, a display device for a vehicle includes a first frame, a second frame configured to move along a first direction with respect to the first frame, a first roller spaced apart from the first frame, a second roller rotatably coupled to the second frame and configured to move along the first direction based on movement of the second frame with respect to the first frame, and a flexible display that is at least partially wound around the second roller, that is configured to be bent around the second roller, and that has an end portion fixed to the first frame. A front surface of the flexible display defines an externally exposed area that is configured to increase based on an increase of a distance between the first roller and the second roller.

Implementations according to this aspect may include one or more of the following features. For example, the second frame may include a pair of bodies that are coupled to the second roller through a pin and that support both sides of the second roller, and a connection bar that connects the pair of bodies to each other and that is configured to guide the flexible display to contact the second roller.

In some implementations, the display device may further include a moving part configured to move the second roller in the first direction, and a guider configured to guide movement of the moving part. In some examples, the moving part may include a moving plate that has an end portion coupled to the second frame and that is configured to move along the first direction based on the second roller moving along the first direction, and a chain that has an end portion coupled to the moving plate, that is configured to be bent around the first roller, and that supports at least a part of a rear surface of the flexible display.

In some implementations, the chain may include a first link that defines a first link hole, a second link that defines a second link hole, and a link pin that is inserted into the first link hole and the second link hole and that connects the first link and the second link. The first link may have an elongated slot shape having a first diameter in a length direction of the chain and a second diameter in a thickness direction of the chain, where the first diameter is greater than the second diameter. In some examples, at least a part of the flexible display may be configured to come in contact with the moving plate or the chain.

In some implementations, the display device may further include a third roller that is rotatably coupled to the second frame and that supports the flexible display to allow a part of the flexible display to be in contact with the moving plate. In some examples, the third roller may be configured to move along the first direction together with the second roller based on the second roller moving along the first direction.

In some implementations, the guider may include a connector coupled to an end of the flexible display, a first control bar that has a first end movably coupled to the connector, that is configured to move along the connector in a second direction perpendicular to the first direction, and that is configured to rotate based on the second roller moving along the first direction, a second control bar that has a first end rotatably coupled to a second end of the first control bar and that is configured to rotate based on the second roller moving along the first direction, and an internal plate that is disposed between the first control bar and the second control bar and that is fixed to the first frame. A coupling portion of the first control bar and the second control bar may pass through the internal plate.

In some implementations, the display device may further include a rack gear arranged at the moving plate along the first direction, a pinion gear engaged with the rack gear, and a motor configured to rotate the pinion gear. In some examples, the moving plate may be configured to, based on rotation of the pinion gear, move along the first direction, and the first control bar and the second control bar may be configured to, based on the moving plate moving along the first direction, rotate about the coupling portion.

In some implementations, the display device may further include a first elastic part that is mounted at the internal plate, that is disposed at a position facing the first roller, and that is configured to elastically support the second roller.

In some implementations, the connector may define a first slot that receives a first protrusion protruding from the first end of the first control bar, that extends in the second direction, and that is configured to guide movement of the first control bar along the connector in the second direction. The internal plate may define a second slot that receives the coupling portion of the first control bar and the second control bar and that is configured to guide movement of the coupling portion. The chain may define a third slot that receives a second protrusion protruding from a second end of the second control bar, that extends in the second direction, and that is configured to guide movement of the second control bar along the chain in the second direction.

In some implementations, the guider may further include an elastic part that is disposed at the coupling portion and that is configured to elastically support the first control bar and the second control bar.

In some implementations, the first frame may be configured to be fixed to a dashboard of the vehicle. In some implementations, the flexible display may be configured to protrude outward from a dashboard of the vehicle based on the second frame moving along the first direction with respect to the first frame. In some implementations, the display device may further include a guide bar that is fixed to the first frame, that extends in the first direction, and that defines a guide rail, and the second frame may include a protruding portion that is coupled to the guide rail.

In some implementations, the display device may further include a magnet fixed to the second frame, a hall sensor fixed to the first frame and configured to sense a distance between the magnet and the hall sensor, and a controller configured to determine the externally exposed area of the flexible display based on the distance between the magnet and the hall sensor. In some examples, the controller may be configured to vary the externally exposed area of the flexible display based on a user of the vehicle or a content to be displayed in the flexible display.

According to another aspect, a display device for a vehicle includes a first frame, a second frame configured to move along a first direction with respect to the first frame, a first roller spaced apart from the first frame in the first direction, a second roller rotatably coupled to the second frame and configured to move along the first direction based on movement of the second frame, and a flexible display that is at least partially wound around the second roller, that is configured to be bent around the second roller, and that has an end portion fixed to the first frame. The flexible display is configured to, based on the second roller moving away from the first roller along the first direction, switch from a first state to a second state that is different from the first state, and based on the second roller moving toward the first roller along the first direction, switch from the second state to the first state.

Implementations according to this aspect may include one or more of the following features. For example, the flexible display may define an externally exposed area, where the externally exposed area in the second state may be greater than the externally exposed area in the first state. In some cases, the display device may include one or more of the features described above.

In some implementations, when the display device for a vehicle is implemented as a flexible display, a space of the dashboard of a vehicle can be saved, and a large screen may be convenient for a user.

In some implementations, the externally exposed area of the flexible display may be manually adjusted by the user. In the same or other implementations, the externally exposed area of the flexible display may be automatically adjusted by the actuator. Accordingly, the size of the screen to be displayed can be adjusted in accordance with the convenience of the user.

In some implementations, the flexible display may be in close contact with the moving plate using the second roller and the third roller such that a portion of the flexible display corresponding to the moving plate may ensure a flat surface which is not bent or curved. Accordingly, the flexible display can provide an image with an improved image quality to the driver.

In some implementations, a back plate in close contact with the flexible display may be provided on a rear surface of the flexible display such that the back plate supports the flexible display to ensure a flat surface of the flexible display which is not bent or curved. Accordingly, the flexible display can provide an image with an improved image quality to the driver.

In some implementations, the movement of the second frame and the second roller in the first direction may be stably supported by the guide bar. Accordingly, warpage and breakage of the flexible display and breakage or erroneous operation of the display device for a vehicle caused when the second frame and the second roller unstably move in the first direction can be effectively suppressed.

In some implementations, the flexible display and the back plate may be firmly coupled to each other by the first magnet. Accordingly, the back plate may be effectively suppressed from being pushed against the flexible display due to repeated movement of the flexible display.

The above and other aspects, features, and advantages will become apparent from the detailed description of the following aspects in conjunction with the accompanying drawings.

DETAILED DESCRIPTION

Figure 1:
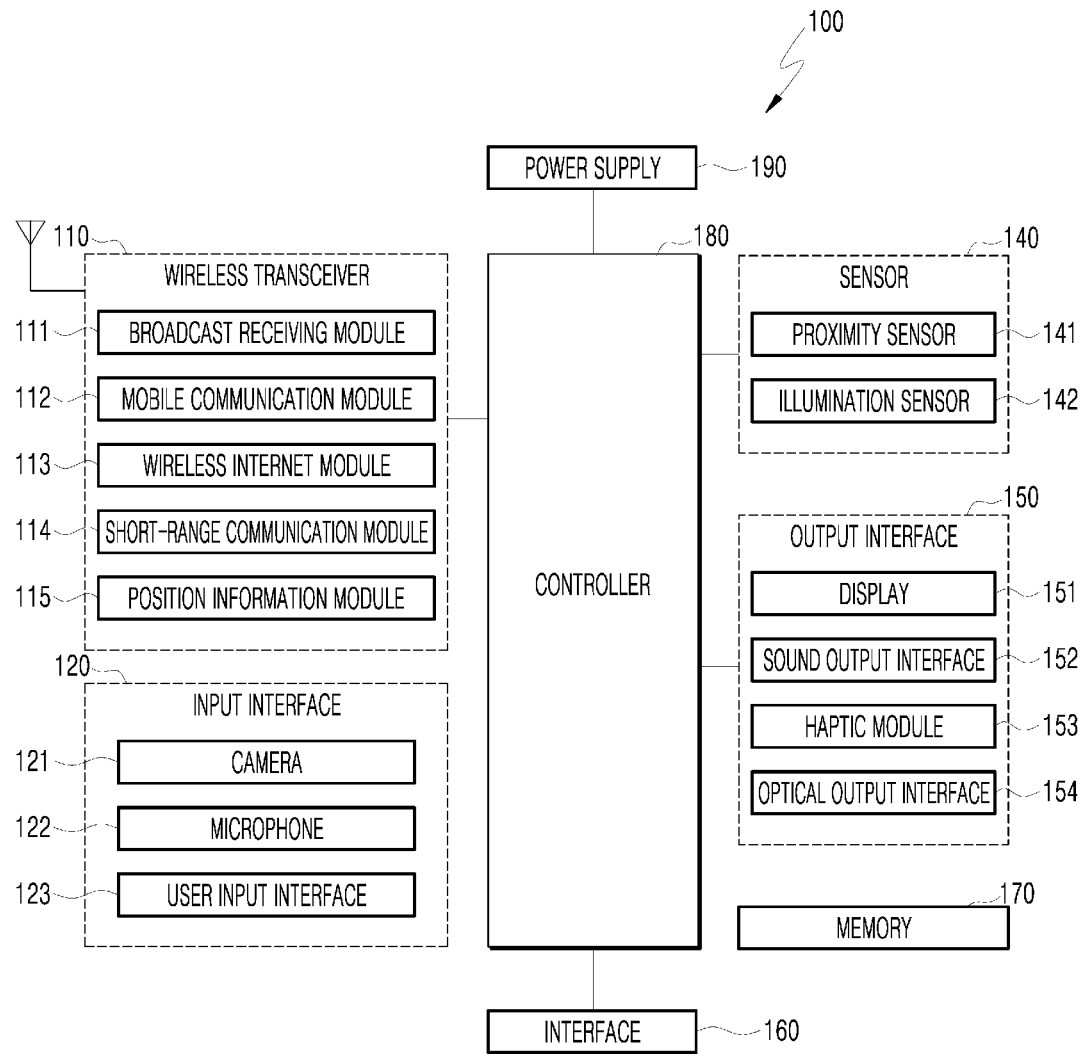
FIG. 1 is a block diagram illustrating an example of a display device for a vehicle.

Hereinbelow, one or more implementations will be described in greater detail with reference to the accompanying drawings. The implementations may be modified in various ways and may have various forms, and example implementations will be illustrated in the drawings and will be described in detail herein. However, this is not intended to limit the implementations to the specific implementations, and the implementations should be understood as including all modifications, equivalents, and replacements that fall within the spirit and technical scope of the implementations.

In the drawings, a rectangular coordinate system (x, y, z) may be used. For example, an X-axis direction in the drawings may refer to a first direction, a Y-axis direction in the drawings may refer to a second direction, and a Z-axis direction in the drawings may refer to a third direction.

FIG. 1 is a block diagram an example of a display device 100 for a vehicle.

A display device 100 for a vehicle may, for example, be mounted on a dashboard 10 of the vehicle and configured to control various types of devices used to operate the vehicle, or to display information related to operation the vehicle and information related to convenience to occupants of the vehicle.

In some implementations, the display device 100 may include a wireless transceiver 110, an input interface 120, a sensor 140, an output interface 150, an interface 160, a memory 170, a controller 180, and a power supply 190. The components illustrated in FIG. 1 are not essential to implement the display device for a vehicle, and the display device for a vehicle described in the present specification may include more or fewer components than the components described above.

In some examples, the wireless transceiver 110 may include one or more modules which enable wireless communication between the display device 100 and a wireless communication system, between the display device 100 and another display device 100, or between the display device 100 and an external server. Further, the wireless transceiver 110 may include one or more modules which connect the display device 100 to one or more networks.

The wireless transceiver 110 may include at least one of a broadcast receiving module 111, a mobile communication module 112, a wireless internet module 113, a short-range communication module 114, or a position information module 115.

The input interface 120 may include a camera 121 or an image input interface which inputs an image signal, a microphone 122 or an audio input interface which inputs an audio signal, and a user input interface 123 (for example, a touch key or a push key (a mechanical key)) which receives information from a user. Voice data or image data collected by the input interface 120 is analyzed to be processed as a control command of the user.

The sensor 140 may include one or more sensors which sense at least one of information in the display device for a vehicle, surrounding environment information around the display device for a vehicle, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121 or a microphone 122), a battery gauge, an environment sensor (for example, a barometer, a hygrometer, a thermometer, a radiation sensor, a thermal sensor, and a gas sensor), or a chemical sensor (for example, an electronic nose, a healthcare sensor, and a biometric sensor). Further, the display device for a vehicle disclosed in the present specification may combine and utilize information sensed by at least two sensors among the above-mentioned sensors.

The output interface 150 is intended to generate an output related to a visual, aural, or tactile stimulus, and may include at least one among a display 151, a sound output interface 152, a haptic module 153, and an optical output interface 154. The display 151 may be configured as a touch screen by forming a mutual layered structure with a touch sensor or being formed integrally therewith. The touch screen simultaneously serves as a user input interface 123 which provides an input interface between the display device 100 and the user and provides an output interface between the display device 100 and the user.

The interface 160 may provide a passage between various types of external devices which are connected to the display device 100. For example, the interface 160 may include at least one of a wired/wireless headset port, an external charger port, a wired/wireless data port, a memory card port, a port which connects a device provided with an identification module, an audio input/output (I/O) port, a video input/output (I/O) port, or an earphone port. The display device 100 may perform appropriate control related to the connected external device in accordance with the connection of the external device to the interface 160.

The memory 170 (e.g., non-transitory memory) may store data which supports various functions of the display device 100. The memory 170 may store a plurality of application programs (or applications) driven in the display device 100, data for operations of the display device 100, and instructions. At least some of the application programs may be downloaded via an external server through wireless communication. Further, at least some of the application programs for basic functions of the display device 100 (for example, functions for receiving and making calls and receiving and sending messages) may be provided in the display device 100 from the time of shipment. The application programs are stored in the memory 170, and installed in the display device 100 to be driven by the controller 180 to perform operations (or functions) of the display device 100.

In addition to the operations related to the application programs, the controller 180 may generally control overall operation of the display device 100. The controller 180 may process signals, data, or information which is inputted or outputted through the above-described components, or drive the application programs stored in the memory 170 to provide or process appropriate information or functions to the user. For example, the controller 180 may include one or more processors, a computer, a electric circuit, a microprocessor, or the like.

For example, in order to drive the application programs stored in the memory 170, the controller 180 may control at least some of components described with reference to FIG. 1. Moreover, the controller 180 may combine and operate at least two of components included in the display device 100 to drive the application programs.

The power supply 190 may receive external power, and supplies the power to the components included in the display device 100 under the control of the controller 180. At least some of the above-described components may operate in cooperation with each other to implement the operation, the control, or the control method of the display device for a vehicle according to various implementations to be described below. Further, the operation, the control, or the control method of the display device for a vehicle may be implemented in the display device for a vehicle by driving at least one application program stored in the memory 170.

Hereinafter, prior to describing various implementations implemented by the display device 100 described above, the above-mentioned components will be described in more detail with reference to FIG. 1.

The wireless transceiver 110 will be described. The broadcast receiving module 111 of the wireless transceiver 110 receives a broadcast signal and/or broadcast-related information from an external broadcast management server through a broadcast channel. The broadcast channel may include a satellite channel and a ground wave channel. Two or more broadcast receiving modules for simultaneous broadcast reception or broadcast channel switching for at least two broadcast channels may be provided to the display device 100.

In some examples, the broadcast management sever may refer to a server which generates and transmits a broadcast signal and/or broadcast related information or a server which is supplied with the previously generated broadcast signal and/or broadcast related information and transmits the broadcast signal and/or the broadcast related information to the display device for a vehicle. The broadcast signal includes not only a TV broadcast signal, a radio broadcast signal, and a data broadcast signal, but also a broadcast signal obtained by combining a TV broadcast signal or a radio broadcast signal with a data broadcast signal.

The broadcast signal may be encoded according to at least one technical standard for transmitting and receiving a digital broadcast signal (or broadcast schemes, for example, ISO, IEC, DVB, or ATSC), and the broadcast receiving module 111 may receive the digital broadcast signal using an appropriate method for the technical specification determined by the technical standard.

The broadcast-related information may refer to information related to a broadcast channel, a broadcast program, or a broadcast service provider. The broadcast-related information may also be provided through the mobile communication network. In this case, the broadcast-related information may be received by the mobile communication module 112.

The broadcast-related information may exist in various types such as an electronic program guide of digital multimedia broadcasting (DMB) or an electronic service guide of a digital video broadcast-handheld (DVB-H). The broadcast signal and/or the broadcast-related information received by the broadcast receiving module 111 may be stored in the memory 170.

The mobile communication module 112 may include a modem that may transmit/receive a wireless signal to/from at least one among a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various types of data in accordance with transmission or reception of a text/multimedia message.

The wireless Internet module 113 refers to a module for wireless Internet access and may be built inside or outside the display device 100. The wireless Internet module 113 may be configured to transmit/receive a wireless signal in a communication network according to wireless Internet technologies.

Wireless Internet technologies may include wireless LAN (WLAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 113 may transmit or receive data in accordance with at least one wireless Internet technology, including Internet technologies which have not been described above.

From the viewpoint that the wireless Internet connection by WiBro, HSDPA, HSUPA, GSM, CDMA, WCDMA, LTE, LTE-A, etc. is performed through a mobile communication network, the wireless Internet module 113 which performs the wireless Internet connection through the mobile communication network may be understood as a type of the mobile communication module 112.

The short-range communication module 114 may support short-range communication using at least one of Bluetooth™, infrared data association (IrDA), ultra wideband (UWB), ZigBee, Short-range Communication (NFC), wireless fidelity (Wi-Fi), Wi-Fi Direct, or Wireless Universal Serial Bus (Wireless USB). The short-range communication module 114 may support wireless communication between the display device 100 and the wireless communication system, between the display device 100 and another display device 100, or between the display device 100 and a network in which another display device 100 (or external server) is located, through the short range wireless communication network. The short-range wireless communication network may be a short-range wireless personal communication network.

The position information module 115 is a module for obtaining the position (or the current position) of a display device for a vehicle, and its representative examples include a global positioning system (GPS) module or a Wi-Fi module. For example, when a GPS module is utilized, the display device for a vehicle may obtain the position of the display device for a vehicle using a signal transmitted from a GPS satellite. As another example, when a Wi-Fi module is utilized, the display device for a vehicle may obtain the position of the display device for a vehicle based on information of a wireless access point (AP) which transmits and receives wireless signals to and from the Wi-Fi module. If necessary, the position information module 115 may perform any function of another module of the wireless transceiver 110 to substitutionally or additionally obtain data on the position of the display device for a vehicle. As a module used to obtain a position (or a current position) of the display device for a vehicle, the position information module 115 is not limited to a module which directly calculates or obtains the position of the display device for a vehicle.

Next, the input interface 120 is provided to input image information (or signals), audio information (or signals), data, or an information input from the user, and in order to input the image information, the display device 100 may include one or a plurality of cameras 121. The camera 121 processes an image frame such as a still image or a moving image obtained by an image sensor in a video call mode or a photographing mode. The processed image frames may be displayed on the display 151 or stored in the memory 170. The plurality of cameras 121 provided in the display device 100 may be disposed to form a matrix structure, and a plurality of pieces of image information having various angles or focal points may be inputted to the display device 100 through the cameras 121 which forms the matrix structure. Further, the cameras 121 may be disposed to have a stereo structure to obtain a left image and a right image to implement a stereoscopic image.

The microphone 122 processes an external sound signal as electronic voice data. The processed voice data may be utilized in various forms in accordance with a function which is being performed by the display device 100 (or an application program which is being executed). In the microphone 122, various noise removal algorithms which remove noise generated during the process of receiving the external sound signal may be implemented.

The user input interface 123 receives information from the user, and when the information is inputted through the user input interface 123, the controller 180 controls the operation of the display device 100 so as to correspond to the inputted information. The user input interface 123 may include a mechanical input means (or a mechanical key, for example, a button located on a front, rear, or side surface of the display device 100, a dome switch, a jog wheel, a jog switch, or the like) and a touch type input means. As one example, the touch type input interface may include a virtual key, a soft key, or a visual key displayed on the touch screen via a software process, or may include a touch key disposed on a portion other than the touch screen. The virtual key or the visual key may be displayed on the touch screen in various shapes, and for example, may be formed by graphics, text, icons, video, or a combination thereof.

The sensor 140 may sense at least one of information in the display device for a vehicle, surrounding environment information around the display device for a vehicle, or user information, and generates a sensing signal corresponding to the information. The controller 180 may control the driving or the operation of the display device 100 or perform data processing, functions, or operations related to the application program installed in the display device 100, based on the sensing signal. Representative sensors among the various sensors which may be included in the sensor 140 will be described in more detail below.

The proximity sensor 141 may be a sensor which senses the presence of an object approaching a predetermined sensing surface or nearby objects, using an electromagnetic field force or infrared ray without any mechanical contact. The proximity sensor 141 may be disposed in an internal area of the mobile terminal, which is enclosed by the above-described touch screen, or in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect the proximity of the object with a change in the electric field in accordance with the proximity of the object having conductivity. In this case, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch." A position at which the object proximately touches the touch screen refers to a position at which the object vertically corresponds to the touch screen when the object proximately touches the touch screen. The proximity sensor 141 may sense a proximate touch and a proximate touch pattern (for example, a proximate touch distance, a proximate touch direction, a proximate touch speed, a proximate touch time, a proximate touch position, a proximate touch movement state, etc.). As described above, the controller 180 may process data (or information) corresponding to the proximate touch operation and the proximate touch pattern sensed by the proximity sensor 141, and may further output visual information corresponding to the processed data on the touch screen. Furthermore, the controller 180 may control the display device 100 to process different operations or data (or information) depending on whether the touch on the same point on the touch screen is a proximity touch or a contact touch.

The touch sensor senses a touch (or a touch input) applied to the touch screen (or the display 151) using at least one of various touch types such as a resistive film type, a capacitive type, an infrared type, an ultrasonic type, or a magnetic field type.

For example, the touch sensor may be configured to convert a change of a pressure which is applied to a specific portion of the touch screen, or a capacitance which is generated in a specific portion, into an electrical input signal. The touch sensor may be configured to detect a position and an area where a touch subject which applies a touch onto the touch screen is touched on the touch sensor, and a capacitance at the time of the touch. Here, the touch subject is an object which applies a touch to the touch sensor, and may include, for example, a finger, a touch pen, a stylus pen, and a pointer.

As described above, when there is a touch input to the touch sensor, corresponding signals are transmitted to a touch controller. The touch controller processes the signal(s) and then transmits corresponding data to the controller 180. By doing this, the controller 180 may confirm which area of the display 151 is touched. Here, the touch controller may be a separate component from the controller 180, or may be the controller 180 itself.

The controller 180 may perform different control or the same control depending on a type of a touch subject which touches the touch screen (or a touch key provided other than the touch screen). Whether to perform the different control or the same control depending on the type of touch subject may be determined in accordance with an operating state of the current display device 100 or an application program which is being executed.

The touch sensor and proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object using an ultrasonic wave. The controller 180 may calculate a position of a wave generating source by information sensed by the optical sensor and the plurality of ultrasonic sensors. A position of the wave generating source may be calculated using the property that light is much faster than an ultrasonic wave, that is, the time in which light reaches the optical sensor is much faster than the time in which the ultrasonic wave reaches the ultrasonic sensor. More specifically, the position of the wave generating source may be calculated using a time difference of the time of arrival of the ultrasonic wave with respect to light which serves as a reference signal.

As seen from the configuration of the input interface 120, the camera 121 includes at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor, which is laminated on a display element, may be configured to scan a motion of a sensing object proximate to the touch screen. More specifically, the photo sensor is formed by mounting photo diodes and transistors (TR) in rows/columns to scan contents which are disposed on the photo sensor using an electrical signal that changes in accordance with an amount of light applied to the photo diode. That is, the photo sensor calculates coordinates of a sensing object in accordance with a changed amount of light, and position information of the sensing object may be obtained through the coordinates.

The display 151 displays (outputs) information processed in the display device 100. For example, the display 151 may display execution screen information of an application program executed in the display device 100, or user interface (UI) or graphic user interface (GUI) information according to the execution screen information.

Further, the display 151 may be configured as a stereoscopic display which displays a stereoscopic image.

A three-dimensional display type such as a stereoscopic type (a glass type), an autostereoscopic type (a glass-free type), a projection type (a holographic type) may be applied to the stereoscopic display.

The sound output interface 152 may output audio data received from the wireless transceiver 110 or stored in the memory 170 in a call signal reception mode, a phone-call mode, a recording mode, a speech recognition mode, or a broadcast reception mode. The sound output interface 152 may also output a sound signal related to a function (for example, a call signal reception sound or a message reception sound) performed in the display device 100. Such a sound output interface 152 may include, for example, a receiver, a speaker, and a buzzer.

The haptic module 153 may generate various tactile effects that can be felt by the user. A representative example of the tactile effect generated by the haptic module 153 may be vibration. An intensity and a pattern of the vibration generated in the haptic module 153 may be controlled by the selection of the user or a setting of the controller 180. For example, the haptic module 153 may compose different vibrations and output the composed vibrations, or sequentially output the different vibrations.

In addition to vibration, the haptic module 153 generates various tactile effects such as effects by a pin arrangement which vertically moves to a contact skin surface, an injection force or a suction force of air through an injection port or a suction port, brushing the skin surface, electrode contact, or stimulation of an electrostatic force or effects of reproducing a cold or hot sensation using a heat absorbing or heat emitting element.

The haptic module 153 may not only transmit a tactile effect by means of direct contact, but may also be implemented to allow the user to feel a tactile effect by muscular sensation of a finger or an arm. Two or more haptic modules 153 may be provided in accordance with a configuration aspect of the display device 100.

The optical output interface 154 outputs a signal for notifying occurrence of an event using light of a light source of the display device 100. Examples of events generated in the display device 100 may be message reception, call signal reception, missed call, alarm, schedule notification, email reception, and information reception through an application.

The signal outputted from the optical output interface 154 is implemented as the display device for a vehicle emits single color or a multicolor light to a front surface or a rear surface. When the display device for a vehicle senses the event confirmation of the user, the signal output may be completed.

The interface 160 serves as a passage between all external devices which are connected to the display device 100. The interface 160 receives data from the external device or is supplied with a power source and transmits the data to each component in the display device 100 or transmits the data in the display device 100 to the external device. For example, the interface 160 may include a wired/wireless headset port, an external charger port, a wired/wireless data port, a memory card port, a port which connects a device provided with an identification module, an audio input/output (I/O) port, a video input/output (I/O) port, an earphone port, etc.

The identification module is a chip in which various information for authenticating a usage right of the display device 100 is stored and includes a user identification module (UIM), a subscriber identification module (SIM), and a universal subscriber identity module (USIM). A device with an identification module (hereinafter, "identification device") may be manufactured as a smart card. Therefore, the identification device may be connected to display device 100 through the interface 160.

The memory 170 may store a program for an operation of the controller 180, or temporarily store input/output data (for example, a phone book, a message, a still image, and a moving image). The memory 170 may store data on a vibration or a sound of various patterns output when the touch is inputted onto the touch screen.

The memory 170 may include at least one type of storage medium of a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The display device 100 may operate in association with a web storage which performs a storage function of the memory 170 on the Internet.

As described above, the controller 180 may control an operation related to the application program and an overall operation of the display device 100. For example, when the state of the display device for a vehicle satisfies a predetermined condition, the controller 180 may execute or release a locking state which restricts an input of a control command of a user for the applications.

The controller 180 may perform control and processing related to voice call, data communication, and video call, or perform a pattern recognition process which recognizes a handwriting input or a picture drawing input performed on the touch screen as a text or an image, respectively. Moreover, the controller 180 may control any one or a combination of a plurality of components described above to implement various implementations which will be described below on the display device 100 according to the present disclosure.

The display 151 displays (outputs) information processed in the display device 100. For example, the display 151 may display execution screen information of an application program executed in the display device 100, or user interface (UI) or graphic user interface (GUI) information according to the execution screen information.

The display 151 may include at least one of a liquid crystal display (LCD), a thin film transistor liquid crystal display (TFT LCD), an organic light emitting diode (OLED), a three-dimensional display (3D display), an electronic ink display (e-ink display), or other types of flexible displays.

In some implementations, the display device 100 may include two or more displays 151. For example, a plurality of displays may be spaced apart from each other or may be integrally disposed on one surface of the display device 100 or may be disposed on different surfaces.

The display 151 may include a touch sensor which senses a touch on the display 151 so as to receive the control command by the touch method. Therefore, when the touch is made on the display 151, the touch sensor senses the touch, and based on the touch the controller 180 generates a control command corresponding to the touch. Contents inputted by the touch method may be letters or numbers, instructions in various modes, menu items which may be designated, or the like.

The microphone 122 may be configured to receive a voice of the user, or other sounds. The microphone 122 is provided in a plurality of locations to receive stereo sounds.

The interface 160 serves as a passage through which the display device 100 may be connected to external devices. For example, the interface 160 may be at least one of a connection terminal for connection with other devices (for example, an earphone or an external speaker), a port for short-range communication (for example, an infrared port (IrDA port), a Bluetooth port, and a wireless LAN port), or a power supply terminal for supplying power to the display device 100. The interface 160 may be implemented as a socket type which accommodates an external card such as a subscriber identification module (SIM), a user identity module (UIM), and a memory card for information storage.

At least one antenna for wireless communication may be provided in the display device 100. The antenna may be embedded in the display device 100 or formed in a case. For example, the antenna which forms a part of the broadcast receiving module 111 (see FIG. 1) may be configured to be drawn from the display device for a vehicle. Alternatively, the antenna may be formed as a film type to be attached onto an inner surface of a housing, or a case including a conductive material may serve as an antenna.

Figure 2:
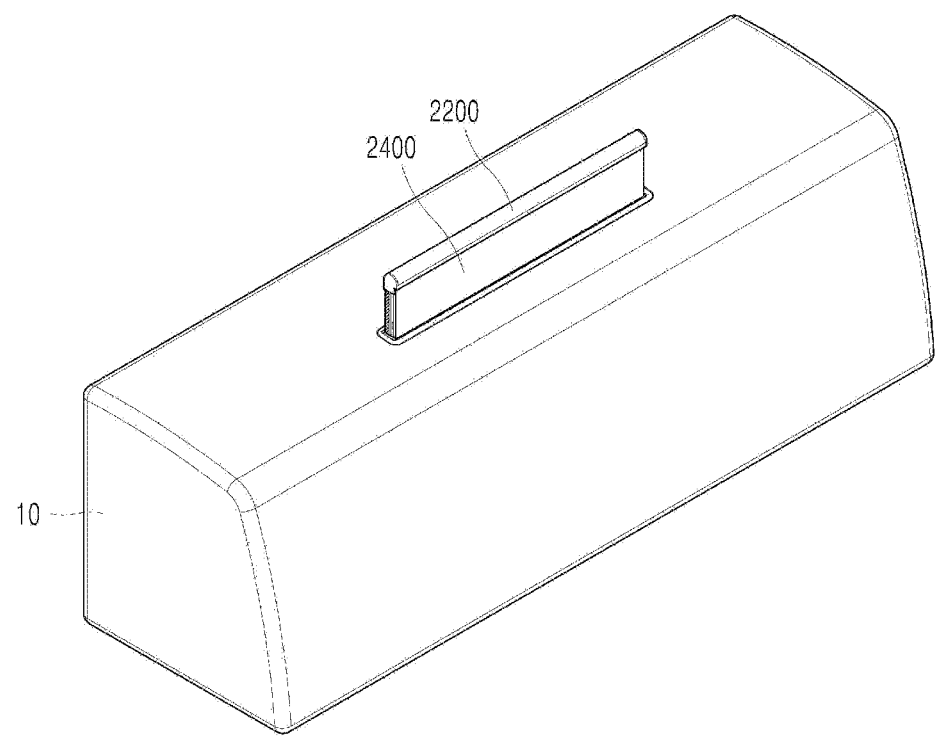
FIG. 2 is a perspective view illustrating an example of a display device for a vehicle.
Figure 3:
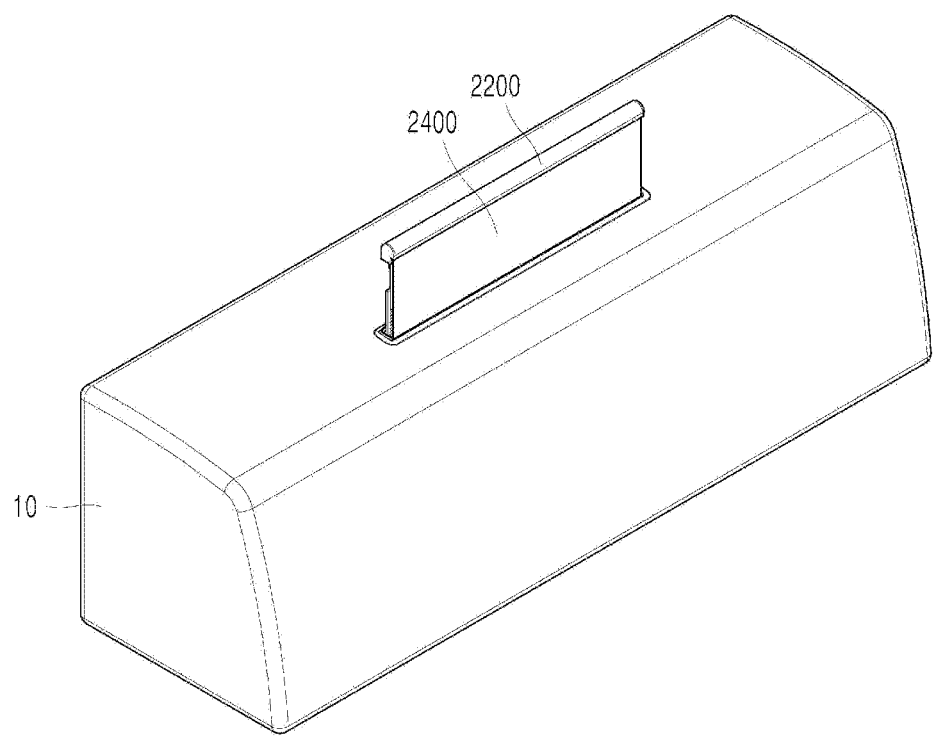
FIG. 3 is a perspective view illustrating the display device of FIG. 2 in a changed state.

FIG. 2 is a perspective view illustrating an example of a display device for a vehicle. FIG. 3 is a perspective view illustrating the display device for a vehicle in which a state of FIG. 2 is changed.

Figure 4:
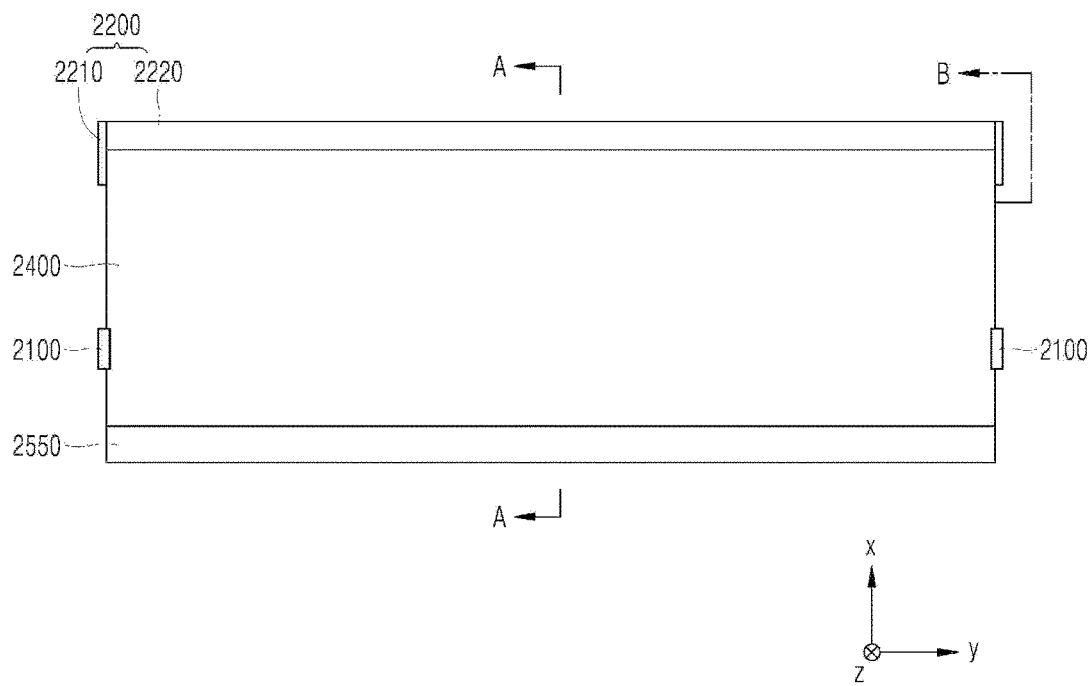
FIG. 4 is a front view illustrating an example of a display device for a vehicle.
Figure 5:
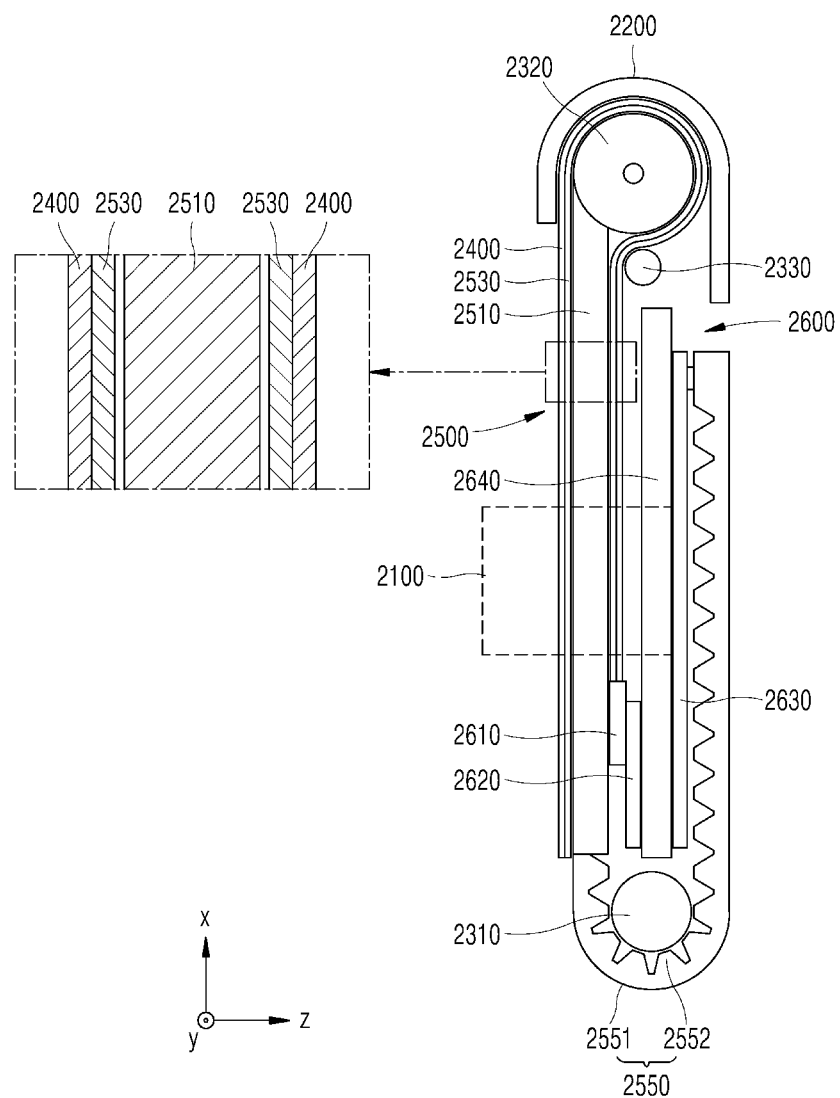
FIG. 5 is a cross-sectional view taken along the line AA of FIG. 4.
Figure 6:
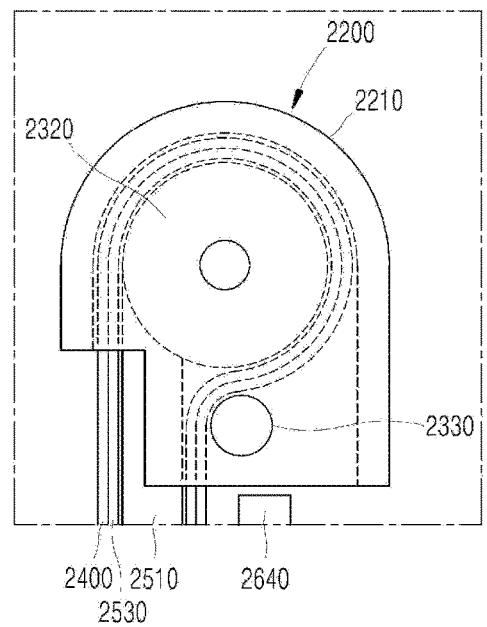
FIG. 6 is a view taken along the line BB of FIG. 4.

FIG. 4 is a front view illustrating an example a display device for a vehicle. FIG. 5 is a cross-sectional view taken along the line AA of FIG. 4. FIG. 6 is a view taken along the line BB of FIG. 4.

The display device for a vehicle may include a first frame 2100, a second frame 2200, a first roller 2310, a second roller 2320, and a flexible display 2400.

The first frame 2100 may be provided to be fixed to a dashboard 10 of a vehicle. A groove for accommodating the display device for a vehicle is formed in the dashboard 10 of the vehicle, and the first frame 2100 may be disposed in an appropriate position in the groove.

The first frame 2100 may be fixedly coupled to the dashboard 10 by being screwed, forcibly fitted, or appropriately coupled to the dashboard 10. In some examples, the flexible display 2400 may be configured to protrude outward from the dashboard 10 of the vehicle based on the second frame 2200 moving along the first direction with respect to the first frame 2100.

The second frame 2200 may be provided to be movable in a first direction with respect to the first frame 2100. The second roller 2320 is rotatably coupled to the second frame 2200 through a pin so that as the second frame 2200 moves in the first direction, the second roller 2320 also moves in the first direction.

For example, the first direction may be an up-down direction of the vehicle or a direction inclined with respect to the up-down direction at a predetermined angle from the up-down direction. The first direction may be a direction which is substantially parallel to a front surface of the flexible display 2400. The first direction may be appropriately adjusted for the convenience of a driver who watches the flexible display 2400.

The first roller 2310 may be provided to be spaced apart from the first frame 2100. The first roller 2310 is not coupled to the first frame 2100, and may be spaced apart from the first frame 2100 to be rotatable.

Further, the first roller 2310 is provided to have a bar shape of which the length direction is perpendicular to the first direction to support the flexible display 2400, a support bar 2550, or a chain 2520 in a width direction of the flexible display 2400, the support bar 2550, or the chain 2520, that is, a direction perpendicular to the first direction.

The second roller 2320 is rotatably coupled to the second frame 2200, and may move in the first direction in accordance with the movement of the second frame 2200.

Further, the second roller 2320 is provided to have a bar shape of which the length direction is perpendicular to the first direction to support the flexible display 2400, in a width direction of the flexible display 2400, that is, a direction perpendicular to the first direction.

As illustrated in FIGS. 4, 5, and 6, the second frame 2200 may include a pair of bodies 2210 and a connection bar 2220.

The bodies 2210 are provided as a pair, and are coupled to the second roller 2320 through a pin to support both sides of the second roller 2320. Accordingly, the second roller 2320 is rotatably coupled to the bodies 2210 and may move in the first direction as the second frame 2200 moves in the first direction.

The connection bar 2220 may connect the pair of bodies 2210 to each other. In this case, for example, the pair of bodies 2210 and the connection bar 2220 may be integrally manufactured. Further, the connection bar 2220 may serve to bring the flexible display 2400 into close contact with the second roller 2320.

Referring to FIG. 6, the flexible display 2400 is disposed in a space formed between in an inner side surface of the connection bar 2220 and a surface of the second roller 2320, and the flexible display 2400 is guided by the inner side surface of the connection bar 2220 to be in close contact with the surface of the second roller 2320.

A degree of close contact between the flexible display 2400 and the surface of the second roller 2320 may be adjusted by appropriately adjusting the interval of the space. One surface of the flexible display 2400 may be designed to be in direct contact with the surface of the second roller 2320. However, when a back plate 2530 is provided between the flexible display 2400 and the second roller 2320, the flexible display 2400 and the second roller 2320 may not be in direct contact with each other.

When the back plate 2530 is provided, a size between the inner side surface of the connection bar 2220 and the surface of the second roller 2320 may be appropriately selected in consideration of a thickness of the back plate 2530. The back plate 2530 will be described in more detail below.

Referring to FIG. 6, the body 2210 may be fixedly coupled to a moving plate 2510. The moving plate 2510 moves in the first direction so that as the moving plate 2510 moves, the second frame 2200 and the second roller 2320, which is coupled to the second frame 2200, may move in the first direction together.

The flexible display 2400 is partially wound around the second roller 2320 and bent by the second roller 2320, and one end portion of the flexible display 2400 is fixed to the first frame 2100.

The flexible display 2400 is formed of a flexible material, and thus can be wound around the second roller 2320. When the flexible display 2400 is wound by the second roller 2320, the flexible display 2400 may be bent by the second roller 2320.

In this case, the flexible display 2400 is bent at a portion thereof which is in close contact with the second roller 2320, and maintains a flat plane shape which is not bent in the remaining portion. However, the flexible display 2400 may be bent by the third roller 2330 at a portion of the flexible display 2400 which is in close contact with the third roller 2330 which will be described below.

The flexible display 2400 may refer to a durable display which is manufactured on a thin and flexible substrate which can be bent, curved, folded, twisted, or rolled like paper while maintaining a characteristic of a flat panel display, and is light and not easily broken.

Figure 7:
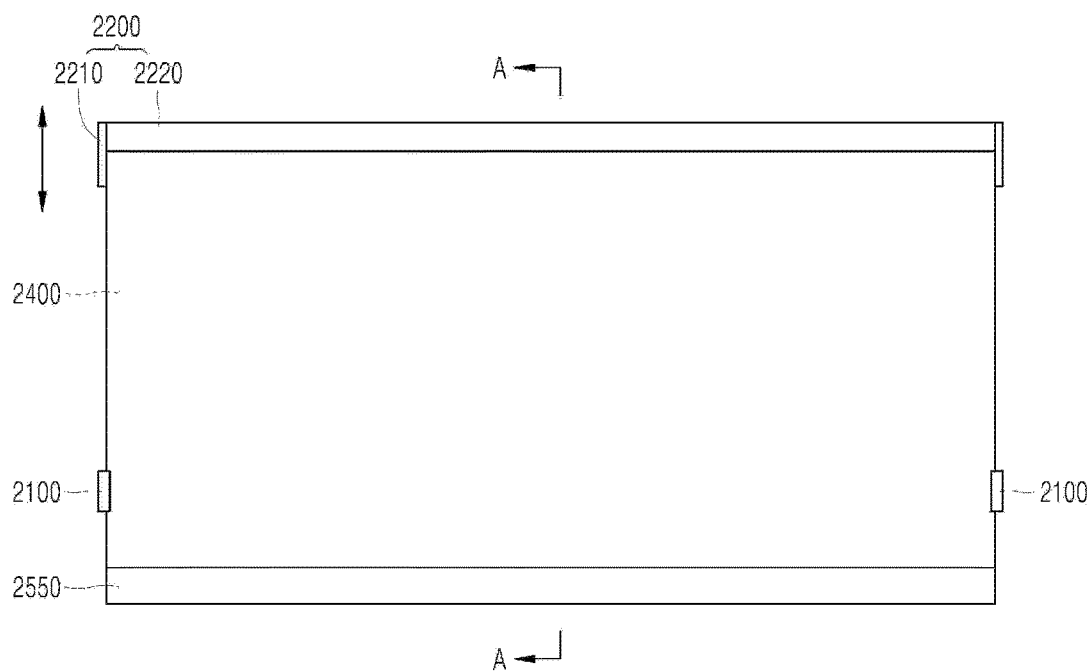
FIG. 7 is a front view illustrating the display device of FIG. 4 in a changed state.
Figure 8:
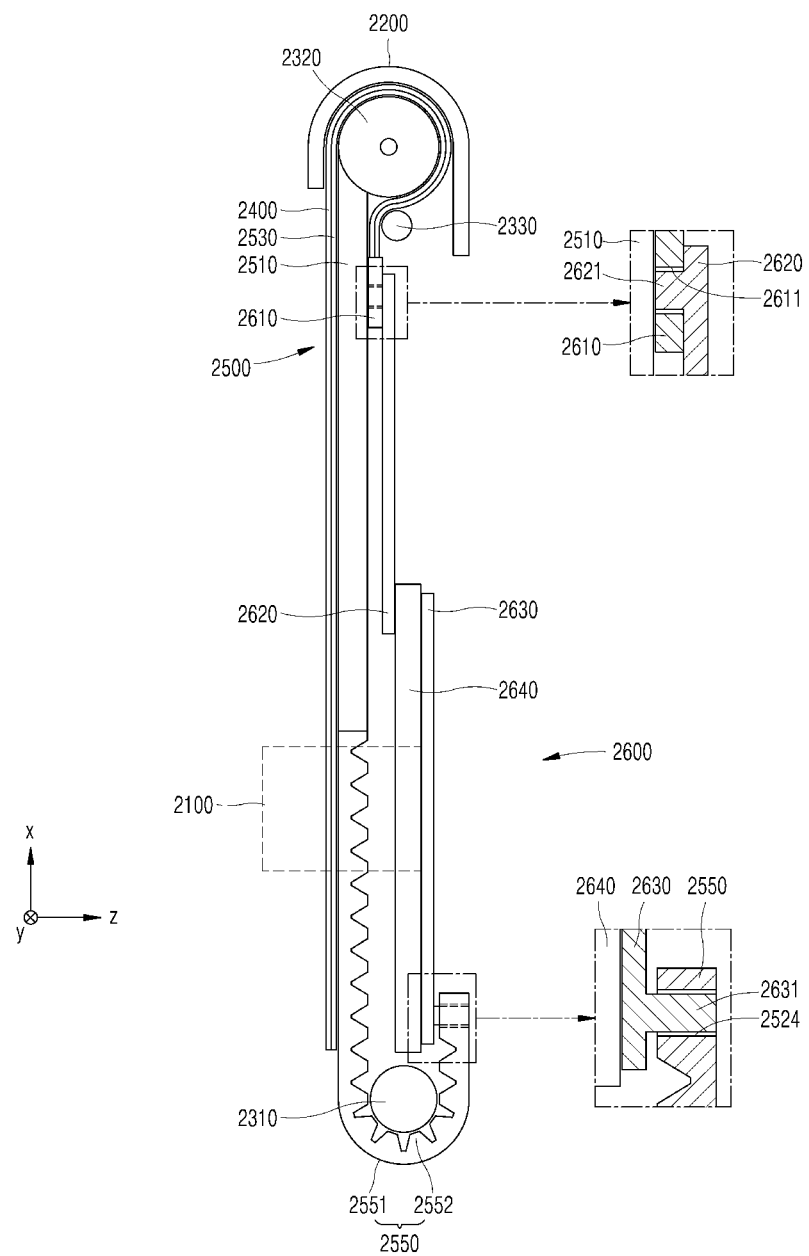
FIG. 8 is a cross-sectional view taken along the line AA of FIG. 7.

FIG. 7 is a front view illustrating the display device for a vehicle in which a state of FIG. 4 is changed. FIG. 8 is a cross-sectional view taken along the line AA of FIG. 7.

The flexible display 2400 may be provided such that an externally exposed area of the front surface is increased as a distance between the first roller 2310 and the second roller 2320 is increased. In this case, the externally exposed area of the flexible display 2400 may be defined as an area of a portion which is exposed outwardly from the dashboard 10 of the flexible display 2400 and is seen by a driver and passengers of the vehicle.

FIGS. 2, 4, and 5 illustrate a state in which the externally exposed area of the flexible display 2400 is relatively small. FIGS. 3, 7, and 8 illustrate a state in which the externally exposed area of the flexible display 2400 is relatively large.

The second roller 2320 moves in the first direction in the state of FIG. 5 such that the distance between the first roller 2310 and the second roller 2320 is increased to be in the state of FIG. 8. In this case, one end portion of the flexible display 2400 is fixed to the first frame 2100 which does not move in the first direction so that a portion of the flexible display 2400 fixed to the first frame 2100 does not move in the first direction.

As the second roller 2320 moves in the first direction to ascend with respect to the first roller 2310, a portion of the flexible display 2400 which is not fixed to the first frame 2100 partially passes a section which is bent by the second roller 2320 to be flatly unfolded.

With this structure, when the second roller 2320 moves in the first direction such that the distance between the first roller 2310 and the second roller 2320 is increased, the externally exposed area of the flexible display 2400 may be increased.

In other words, when the second roller 2320 moves in the first direction to be away from the first roller 2310, the flexible display 2400 is switched from the first state to the second state, and when the second roller 2320 moves in the first direction to be close to the first roller 2310, the flexible display 2400 may be switched from the second state to the first state.

For example, FIGS. 2, 4, and 5 illustrate the flexible display 2400 in the first state and FIGS. 3, 7, and 8 illustrate a flexible display 2400 in the second state.

Referring to the drawings, the externally exposed area of the front surface of the flexible display 2400 is larger in the second state than in the first state.

Accordingly, due to the above-described structure, when a distance between the first roller 2310 and the second roller 2320 in the first direction is reduced, the externally exposed area of the flexible display 2400 is decreased, and when the distance between the first roller 2310 and the second roller 2320 in the first direction is increased, the externally exposed area of the flexible display 2400 may be increased.

The display device for a vehicle may further include a moving part 2500 and a guider 2600. The moving part 2500 may serve to move the second roller 2320 in the first direction. The guider 2600 may serve to guide the movement of the moving part 2500.

For example, the moving part 2500 may include one or more plates or one or more chains. The guider 2600 may include one or more bars.

The moving part 2500 may include a moving plate 2510 and a support bar 2550. In some implementations, a chain 2520 may be used to replace the support bar 2550. The support bar 2550 will be described first, and the chain 2520 will be described below with reference to a separate drawing.

The moving plate 2510 may be provided as a rigid material, and one end portion of the moving plate 2510 is fixedly coupled to the second frame 2200. The moving plate 2510 may be provided to move in the first direction as the second roller 2320 moves in the first direction.

The second roller 2320 may be configured to move in the first direction together with the second frame 2200 so that the moving plate 2510 may move in the first direction as the second frame 2200 moves in the first direction.

A flat portion of the flexible display 2400 may be in close contact with one surface of the moving plate 2510, and thus the flat portion of the flexible display 2400 may be maintained by the moving plate 2510.

One end portion of the support bar 2550 may be coupled to the moving plate 2510. The support bar 2550 and the moving plate 2510 may be coupled to each other by an adhesive. When the support bar 2550 is unfolded, the support bar 2550 may have an entirely plate shape, but may be bent by the first roller 2310.

As the moving plate 2510 moves in the first direction, the support bar 2550 may move while partially being wound around the first roller 2310. As illustrated in FIGS. 5 and 8, as the second roller 2320 is far from the first roller 2310, the support bar 2550 moves in the first direction to be close to the first roller 2310 and is bent by the first roller 2310 so that a traveling direction is changed to 180 degrees, and the support bar 2550 may move in the first direction to be away from the first roller 2310.

Further, the support bar 2550 may be provided to support at least a part of a rear surface of the flexible display 2400.

Referring to FIG. 8, when the second roller 2320 is far from the first roller 2310 in the first direction, a part of the support bar 2550, that is, a portion adjacent to a portion coupled to the moving plate 2510, may be bent or curved around the first roller 2310 and changes direction to move in the same direction as the second roller 2320. In this case, a part of the rear surface of the flexible display 2400 may be supported.

Due to this structure, a part of the flexible display 2400, for example, a flat portion, may be provided to be in close contact with the moving plate 2510 or the support bar 2550.

Similarly, when the chain 2520 is provided instead of the support bar 2550, a part of the flexible display 2400 may be provided to be in close contact with the moving plate 2510 or the chain 2520.

The support bar 2550 may be provided as a flexible material so as to be bendable, and may include a base 2551 and a support 2552. In some examples, the base 2551 and the support 2552 may be integrally manufactured. In some implementations, the support 2552 may be attached to the base 2551 to form the support bar 2550. In some examples, the base 2551 and the support 2552 may be formed of the same material.

The support bar 2550 may be coupled at the base 2551. The support 2552 has a trapezoidal cross-section, and referring to FIG. 5, may be formed to have a bar shape perpendicular to the first direction.

A plurality of supports 2552 may be provided, and the supports 2552 may be disposed at regular intervals in a moving direction of the support bar 2550. The supports 2552 may be appropriately formed to have a trapezoidal cross-section so that when the supports 2552 are wound around the first roller 2310 and are bent, no interference between adjacent supports 2552 due to the bending is caused.

The display device for a vehicle may further include a third roller 2330. The third roller 2330 is rotatably coupled to the second frame 2200, and may support the flexible display 2400 such that a part of the flexible display 2400 is in close contact with the moving plate 2510.

Further, the third roller 2330 is provided to have a bar shape of which the length direction is perpendicular to the first direction to support the flexible display 2400 in a width direction of the flexible display 2400, that is, a direction perpendicular to the first direction.

As illustrated in FIGS. 5 and 8, the second roller 2320 and the third roller 2330 are spaced apart from each other, and a space may be formed therebetween. The flexible display 2400 may be disposed to pass through the space.

Due to this structure, the flexible display 2400 is supported by the second roller 2320 and the third roller 2330, and the flexible display 2400 may be more effectively in close contact with the moving plate 2510.

The flexible display 2400 can be easily bent or curved. In some implementations, the flexible display 2400 may be caused to be in close contact with the moving plate 2510 using the second roller 2320 and the third roller 2330 so that a portion of the flexible display 2400 corresponding to the moving plate 2510 may ensure a plane which is not bent or curved. Therefore, the flexible display 2400 may provide an image with an improved image quality to the driver.

The third roller 2330 may be rotatably coupled to the body 2210 of the second frame 2200 together with the second roller 2320. Therefore, the third roller 2330 may move in the first direction together with the second roller 2320 as the second roller 2320 moves in the first direction. In this case, the distance between the second roller 2320 and the third roller 2330 may be constantly maintained regardless of the movement in the first direction.

Due to this structure, as the second roller 232 moves in the first direction, regardless of the increase or decrease of the externally exposed area of the flexible display 2400, the second roller 2320 and the third roller 2330 may effectively cause the flexible display 2400 to be in close contact with the moving plate 2510.

Figure 9:
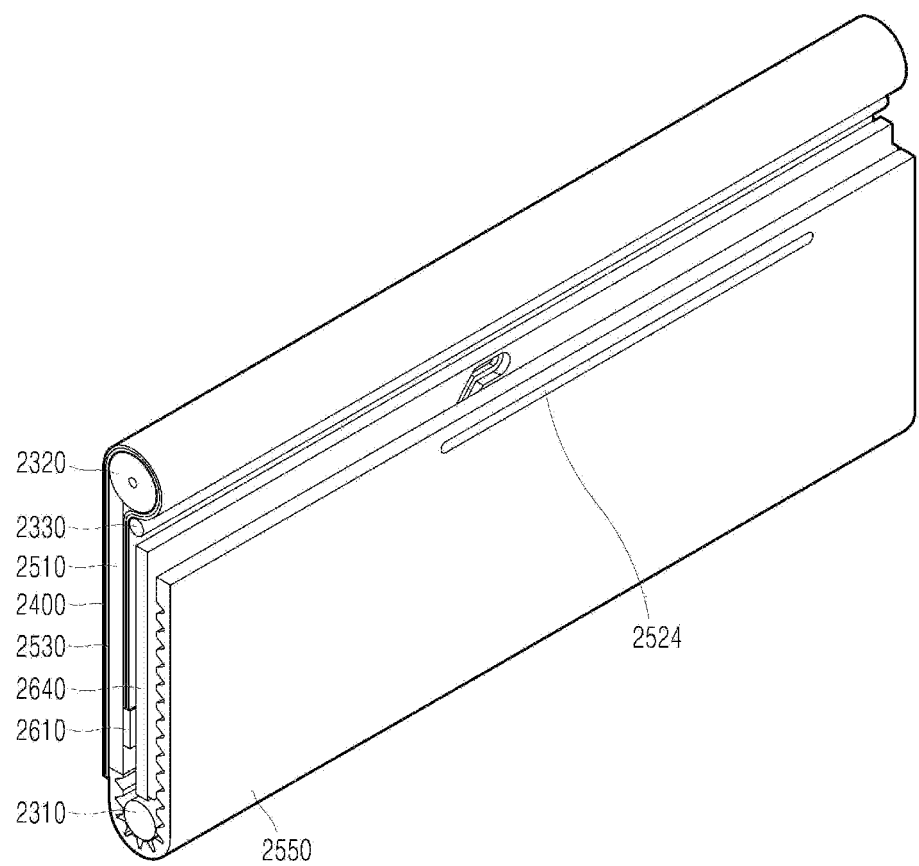
FIG. 9 is a perspective view illustrating example components of an example display device for a vehicle.
Figure 10:
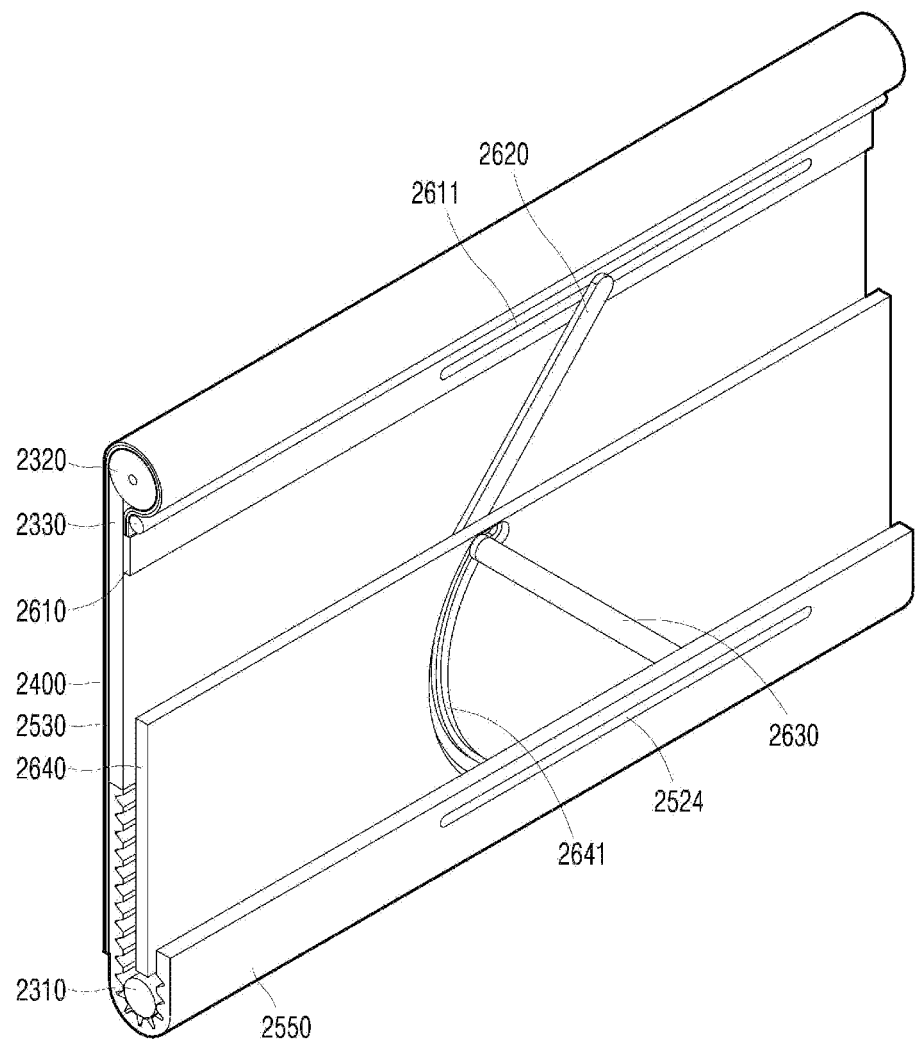
FIG. 10 is a perspective view illustrating the display device for a vehicle of FIG. 9 in a changed state.

FIG. 9 is a perspective view illustrating example components of a display device for a vehicle. FIG. 10 is a perspective view illustrating the display device for a vehicle in which a state of FIG. 9 is changed. For clear description, in FIGS. 9 and 10, some components of the display device for a vehicle may be omitted.

Referring to FIGS. 9 and 10, the guider 2600 may include a connector 2610, a first control bar 2620, a second control bar 2630, and an internal plate 2640.

The connector 2610 may be coupled to one end of the flexible display 2400. For example, the flexible display 2400 may be coupled to the connector 2610 by an adhesive. The connector 2610 may move in the first direction in accordance with the rotation of the first control bar 2620.

As illustrated in FIGS. 9 and 10, the connector 2610 is disposed such that the length direction is perpendicular to the first direction so as to guide the flexible display 2400 to move in the first direction while having the same position in the width direction, that is, a direction perpendicular to the first direction.

When the connector 2610 is close to the first roller 2310, the externally exposed area of the flexible display 2400 is reduced, but in contrast, when the connector 2610 is far away from the first roller 2310, the externally exposed area of the flexible display 2400 is increased.

One end of the first control bar 2620 is coupled to the connector 2610, and is movable with respect to the connector 2610 in a direction perpendicular to the first direction. Further, the first control bar 2620 may be provided to rotate as the second roller 2320 moves in the first direction.

When the second roller 2320 moves in the first direction to be far away from the first roller 2310 or to be close to the first roller 2310, the first control bar 2620 may rotate in a clockwise direction or a counterclockwise direction to pull the connector 2610.

The first controller bar 2620 pulls the connector 2610 regardless of the position of the second roller 2320 in the first direction such that the degree of close contact between the flexible display 2400 and the moving plate 2510, the second roller 2320, or the third roller 2330 may be increased.

One end of the second control bar 2630 is coupled to the other end of the first control bar 2620, and the second control bar 2630 may be provided to rotate as the second roller 2320 moves in the first direction. The first control bar 2620 and the second control bar 2630 may be rotatably coupled to each other.

The other end of the second control bar 2630 may be coupled to an end portion of the support bar 2550 or the chain 2520. When the second roller 2320 moves in the first direction to be far away from the first roller 2310 or to be close to the first roller 2310, the second control bar 2630 rotates in a clockwise direction or a counterclockwise direction to pull the support bar 2550 or the chain 2520.

The second control bar 2630 pulls the support bar 2550 or the chain 2520 regardless of the position of the second roller 2320 in the first direction such that the degree of close contact between the support bar 2550 or the chain 2520 and the first roller 2310 may be increased.

In order to allow the first control bar 2620 to pull the connector 2610 and allow the second control bar 2630 to pull the support bar 2550 or the chain 2520, the first control bar 2620 and the second control bar 2630 need to have a restoring force with respect to rotation so as to reduce an angle formed by the first control bar 2620 and the second control bar 2630.

Therefore, to this end, a second elastic part 2720 may be disposed at a portion where the first control bar 2620 and the second control bar 2630 are coupled. The second elastic part 2720 will be described below in more detail with reference to the drawings.

The internal plate 2640 is fixed to the first frame 2100, and the coupling portion of the first control bar 2620 and the second control bar 2630 passes through the internal plate. The internal plate 2640 may be provided with a second slot 2641 to be described below, and the internal plate 2640 may guide the movement of the coupling portion of the first control bar 2620 and the second control bar 2630 using the second slot 2641.

In order to guide the rotation and the movement of the first frame 2100 and the second frame 2200, a first slot 2611, a second slot 2641, and a third slot 2524 may be provided.

The connector 2610 may include the first slot 2611 into which a first protrusion 2621 protruding from one end of the first control bar 2620 is inserted. The first slot 2611 has a length direction formed to be perpendicular to the first direction, and guides the movement of the first control bar 2620 with respect to the connector 2610.

Accordingly, one end of the first control bar 2620 is coupled to the first slot 2611 so as to move in a direction perpendicular to the first direction, and may be guided by the first slot 2611 to be moved.

The internal plate 2640 may include the second slot 2641 into which the coupling portion of the first control bar 2620 and the second control bar 2630 is inserted. The second slot 2641 guides the movement of the coupling portion.

In the coupling portion of the first control bar 2620 and the second control bar 2630, the first control bar 2620 and the second control bar 2630 are rotatably coupled to each other, and the coupling portion is guided by the second slot 2641 which is formed to pass through the internal plate 2640 to be moved on the internal plate 2640.

The second slot 2641 may be formed to have an appropriate curvature in consideration of a designed movement of the first control bar 2620 and the second control bar 2630.

The support bar 2550 or the chain 2520 may include the third slot 2524 into which a second protrusion 2631 protruding from one end of the second control bar 2630 is inserted. The third slot 2525 has a length direction formed to be perpendicular to the first direction, and guides the movement of the second control bar 2630 with respect to the chain 2520.

Therefore, one end of the second control bar 2630 is coupled to the third slot 2524 so as to move in a direction perpendicular to the first direction, and may be guided by the third slot 2524 to be moved.

The moving part 2500 may further include a back plate 2530. The back plate 2530 may be disposed so as to be opposite to the flexible display 2400, and at least a part of the back plate may be formed of a metal plate having elasticity.

The flexible display 2400 may be easily bent or curved. In some implementations, the back plate 2530, which is in close contact with the flexible display 2400, is provided on the rear surface of the flexible display 2400 so that the back plate 2530 supports the flexible display 2400 to ensure a flat surface of the flexible display 2400 which is not bent or curved. Therefore, the flexible display 2400 may provide an image with an improved image quality to the driver.

Referring to FIGS. 5 and 8, the back plate 2530 is coupled to the flexible display 2400 with a size and a shape corresponding to the flexible display 2400 so as to move together with the flexible display 2400 as one body. A specific structure of the back plate 2530 will be described below in more detail with reference to the drawings.

Figure 11:
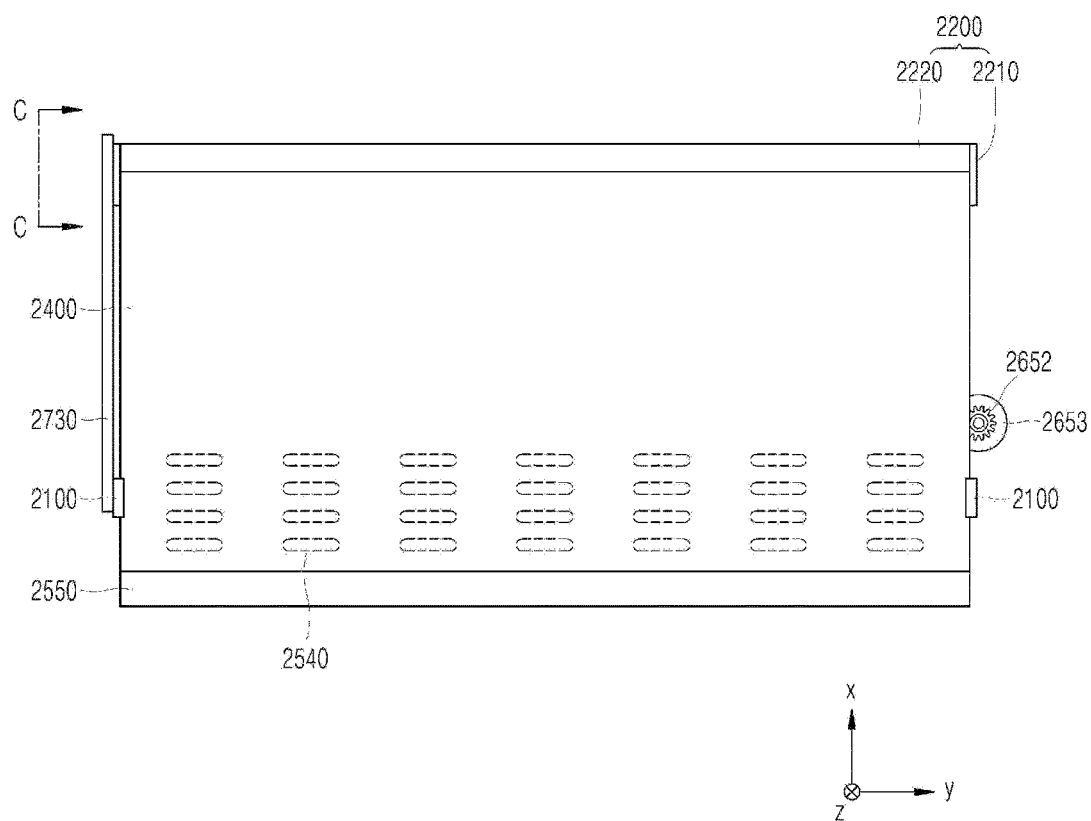
FIG. 11 is a front view illustrating an example of a display device for a vehicle.
Figure 12:
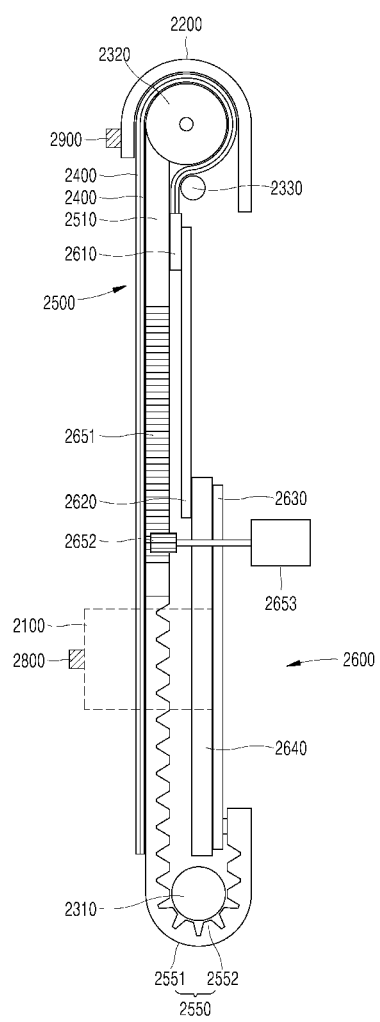
FIG. 12 is a side view of the display device in FIG. 11.
Figure 13:
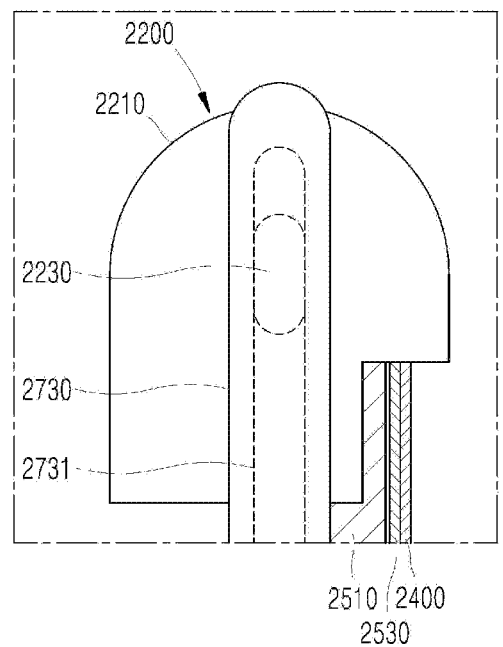
FIG. 13 is a view taken along the line CC of FIG. 11.

FIG. 11 is a front view illustrating an example of a display device for a vehicle. FIG. 12 is a side view of FIG. 11. FIG. 13 is a view taken along the line CC of FIG. 11.

As illustrated in FIGS. 11 and 13, the display device for a vehicle may further include a guide bar 2730. The guide bar 2730 is provided to be fixed to the first frame 2100, and has a length direction disposed in the first direction and includes a guide rail 2731 to which the protruding portion 2230 of the second frame 2200 is coupled.

In some implementations, the second frame 2200 and the second roller 2320 may be guided by the guide bar 2730 to move in the first direction. The guide bar 2730 is formed of a rigid material, and one side of the guide bar 2730 is fixed to the first frame 2100 such that the second frame 2200 and the second roller 2320 may be stably supported to move in the first direction.

In some implementations, the movement of the second frame 2200 and the second roller 2320 in the first direction is stably supported by the guide bar 2730 so that warpage and breakage of the flexible display 2400 and breakage or erroneous operation of the display device for a vehicle caused when the second frame 2200 and the second roller 2320 unstably move in the first direction can be effectively suppressed.

The moving part 2500 may further include a first magnet 2540. For example, the first magnet 2540 may be disposed in a part of the flexible display 2400 to couple the flexible display 2400 to the back plate 2530.

As illustrated in FIG. 11, a plurality of first magnets 2540 are provided, and an appropriate number of first magnets 2540 may be aligned in a part of the flexible display 2400 horizontally and vertically. In this case, a portion of the flexible display 2400 which is not bent by the second roller 2320 may be selected as a portion of the flexible display 2400 which includes the first magnets 2540.

The first magnets 2540, for example, may be provided to be bonded to the rear surface of the flexible display 2400, that is, a surface which is opposite to the back plate 2530, by an adhesive.

In some implementations, the flexible display 2400 and the back plate 2530 are firmly coupled to each other by the first magnets 2540 so that the back plate 2530 can be effectively suppressed from being pushed against the flexible display 2400 due to the repeated movement of the flexible display 2400.

The size of the externally exposed area of the flexible display 2400 in the display device for a vehicle may be manually changed by the driver. For example, when the driver lifts up the front surface of the flexible display 2400, the first roller 2310 ascends to increase the externally exposed area of the flexible display 2400. In contrast, when a driver pushes down the front surface of the flexible display 2400, the first roller 2310 descends to reduce the externally exposed area of the flexible display 2400.

In order to smoothly operate the display device for a vehicle, the magnitude of a restoring force of the second elastic part 2720 needs to be appropriately adjusted.

In some implementations, the display device for a vehicle may include an actuator 2650 which automatically changes the size of the externally exposed area of the flexible display 2400. As illustrated in FIGS. 11 and 12, the display device for a vehicle may further include the actuator 2650 which operates the guider 2600. The actuator 2650 may include a rack gear 2651, a pinion gear 2652, and a motor 2653.

The rack gear 2651 is formed on the moving plate 2510, and a length direction thereof is disposed to be parallel to the first direction. The pinion gear 2652 may be disposed to be engaged with the rack gear 2651. In some examples, in order to maintain the engaged state of the pinion gear and the rack gear 2651, a casing may be provided to bring the pinion gear 2652 and the rack gear 2651 into close contact with each other.

The motor 2653 may be provided to rotate the pinion gear 2652. The motor 2653 may be fixed to an empty space of the dashboard 10 of the vehicle or the display device for a vehicle.

The pinion gear 2652 is disposed at a rotational axis of the motor 2653 such that the pinion gear 2652 rotates by the rotation of the motor 2653 and the rack gear 2651, which is engaged with the pinion gear 2652, moves in the first direction. Therefore, the moving plate 2510 on which the rack gear 2651 is formed may move in the first direction.

As the pinion gear 2652 rotates, the moving plate 2510 moves in the first direction and the first control bar 2620 and the second control bar 2630 may rotate around the coupling portion.

That is, as the moving plate 2510 moves in the first direction, the second frame 2200 and the second roller 2320 move in the first direction, and thus the externally exposed area of the flexible display 2400 may be increased or reduced.

The controller 180 provided in the display device for a vehicle is electrically connected to the motor 2653, and may control the operation of the motor 2653 such that the externally exposed area of the flexible display 2400 is increased or reduced.

The display device for a vehicle may further include a hall sensor 2800 and a second magnet 2900. The hall sensor 2800 may be provided to be fixed to the first frame 2100. The second magnet 2900 may be provided to be fixed to the second frame 2200. Therefore, the hall sensor 2800 is fixed, and the second magnet 2900 may move together with the second frame 2200 in the first direction. The hall sensor 2800 may be connected to the controller 180.

The hall sensor 2800 senses a distance from the second magnet 2900 so that the controller 180 provided in the display device for a vehicle can determine the externally exposed area of the flexible display 2400.

That is, as the second magnet 2900 moves in the first direction, the hall sensor 2800 senses a change in magnetic field of the second magnet 2900, and the controller 180 ascertains the distance between the hall sensor 2800 and the second magnet 2900 in the first direction based on the change in magnetic field. The controller 180 may determine the externally exposed area of the flexible display 2400 based on the distance between the hall sensor 2800 and the second magnet 2900 in the first direction.

Figure 14:
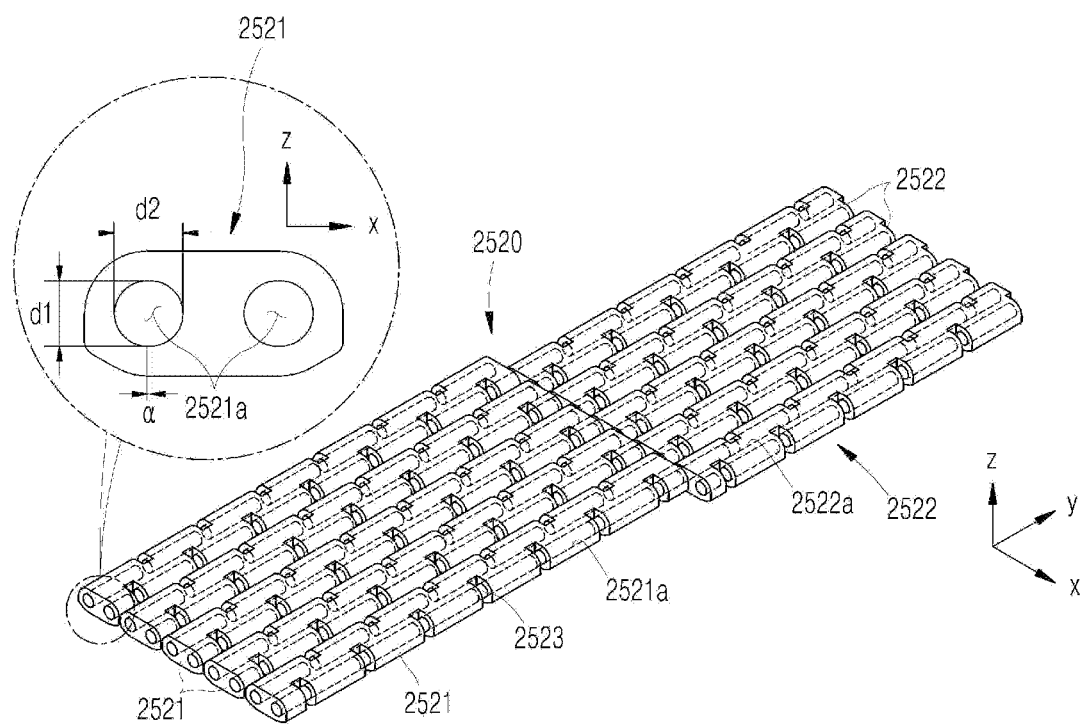
FIG. 14 is a perspective view illustrating an example chain.
Figure 15:
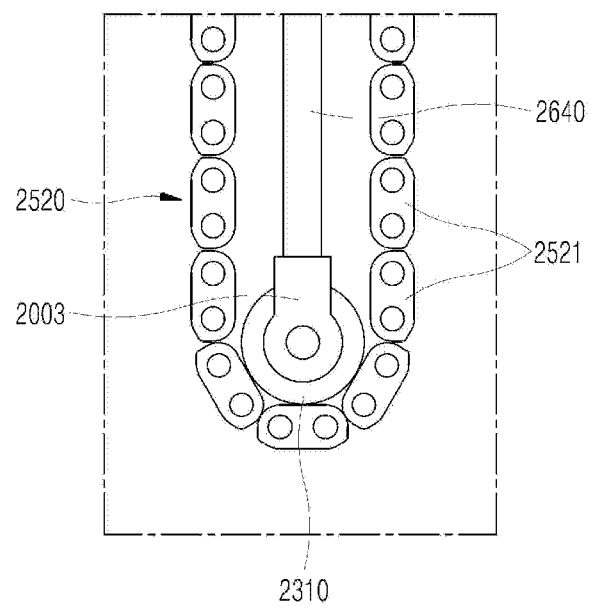
FIG. 15 is a view illustrating an example of operation of the chain.

FIG. 14 is a perspective view illustrating an example of a chain 2520. FIG. 15 is a view for explaining an operation of a chain 2520.

As described above, the chain 2520 is provided instead of the support bar 2550, and performs the same function as the support bar 2550. Therefore, one end portion of the chain 2520 is coupled to the moving plate 2510 and is bent or curved around the first roller 2310, and supports at least a part of the rear surface of the flexible display 2400.

The chain 2520, for example, may be provided as a metal, and one end portion of the chain 2520 has a pin. The pin is embedded into the moving plate 2510 so that the chain 2520 and the moving plate 2510 may be coupled to each other. However, the coupling method is not limited thereto.

Since the structure of the support bar 2550 has been described above, redundant description of the chain 2520 and the support bar 2550 will be omitted, and a particular structure of the chain 2520 will be described below.

The chain 2520 may include a first link 2521, a second link 2522, and a link pin 2523. A plurality of first links 2521 and a plurality of second links 2522 are provided.

The plurality of first links 2521 are disposed along the front-rear direction, and the plurality of second links 2522 are also disposed along the front-rear direction. The first links 2521 and the second links 2522 are fastened to each other.

In order to fasten the first links 2521 and the second links 2522, a first link hole 2521*a* is formed in the first link 2521 and a second link hole 2522*a* is formed in the second link 2522, and the link pin 2523 is coupled to the first link hole 2521*a* and the second link hole 2522*a* by being inserted therein.

The first link 2521 and the second link 2522 may relatively rotate with the link pin 2523 that fastens them serving as a rotational axis. In the first link 2521, two identical first link holes 2521*a* are formed to be spaced apart from each other, and in the second link 2522, two identical second link holes 2522*a* are formed to be spaced apart from each other.

The link pin 2523 has a circular shape in cross-section, and the second link hole 2522*a* also has a circular shape in cross-section. In this case, the first link hole 2521*a* may be formed to have a slot hole shape with a longer diameter in the length direction of the chain 2520. That is, the first link hole 2521*a* is formed such that a diameter $d2$ of the length direction is greater than a diameter $d1$ of the thickness direction (by $\alpha$). For example, the diameter $d2$ in the x-axis direction may be equal to a sum of the diameter $d1$ and the length $\alpha$.

For example, the first link hole 2521*a* is formed such that a diameter $d2$ of a length direction is 0.2 mm larger than a diameter $d1$ of a thickness direction in the z-axis direction.

Unlike when the chain 2520 (a combination of links) is straight, when the chain 2520 is bent, for example, when the chain 2520 is bent or curved around the first roller 2310, for a smooth deformation of the chain 2520, the intervals between some links may be spaced apart from each other, or the intervals between some links may be close to each other. This is because the chain 2520 that is wound around the first roller 2310 may not form a part of a complete circle (for example, a complete semicircle).

In some implementations, in the display device for a vehicle, in consideration of the above-description, the first link hole 2521*a* may be formed to have a long hole shape having a large diameter in the length direction of the chain 2520 so that length compensation of the chain 2520 can be achieved. For instance, the first link hole 2521*a* may have an elongated slot shape having a first diameter in a length direction (e.g., x-direction) of the chain 2520 and a second diameter in a thickness direction (e.g., z-direction) of the chain 2520, the first diameter being greater than the second diameter.

In some implementations, The display device for a vehicle may further include a third frame 2003. Referring to FIG. 15, the third frame 2003 is fixedly coupled to a lower end of the internal plate 2640, and the first roller 2310 is rotatably coupled to the third frame 2003.

For example, one pair of third frames 2003 is provided, and each third frame 2003 is fixedly coupled to both sides of the lower end of the internal plate 2640. Accordingly, both ends of the first roller may be rotatably coupled to the third frame 2003.

The third frame 2003 allows the first roller 2310 to be rotatably coupled to the internal plate 2640, which does not move in the first direction. Accordingly, the chain 2620 may be bent by the first roller 2310 and simultaneously move in the first direction while being stably supported by the first roller 2310.

The structure of the third frame 2003 may also be employed by the display device for a vehicle which includes the support bar 2550.

Figure 16:
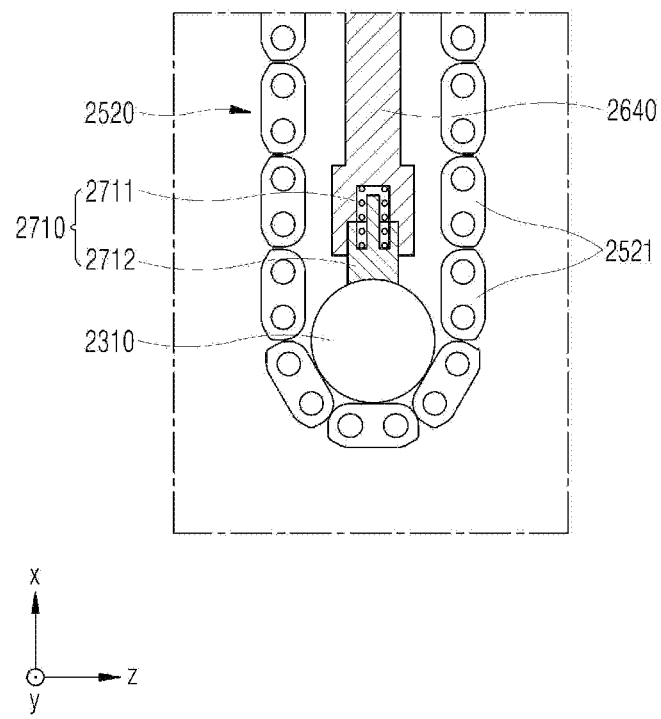
FIG. 16 is a view illustrating an example of a first elastic part.
Figure 17:
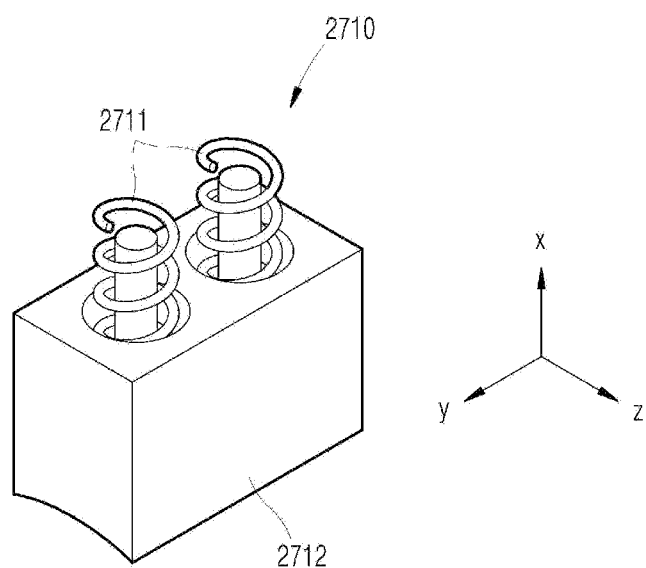
FIG. 17 is a perspective view illustrating the first elastic part.

In some examples, instead of the third frame 2003, the first elastic part 2710 may also be used to support the first roller 2310. FIG. 16 is a view illustrating an example of a first elastic part 2710. FIG. 17 is a perspective view illustrating the first elastic part 2710.

The display device for a vehicle may include the first elastic part 2710 instead of the third frame 2003. In this case, the first elastic part 2710 is mounted in the internal plate 2640 at a portion where the internal plate 2640 and the first roller 2310 are opposite to each other, and elastically supports the second roller 2320.

The first elastic part 2710 may include an elastic body 2711 and a pusher 2712. The pusher 2712 may include a protrusion to mount the elastic body 2711. Referring to FIG. 16, a hole into which the elastic body 2711 and the protrusion of the pusher 2712 are inserted may be formed at a lower end of the internal plate 2640.

The elastic body 2711 may be formed to have a coil spring shape. The elastic body 2711 may be configured to store an elastic force in a compressed state, and apply pressure to the first roller 2310 in this state.

The elastic body 2711 may be provided to apply pressure to the first roller 2310 by means of the pusher 2712. In some implementations, only the elastic body 2711 may be provided to be mounted at the lower end of the internal plate 2640, and apply pressure to the first roller 2310 without using the pusher 2712.

Pressure may be applied to the first roller 2310 by the first elastic part 2710 so that the first roller 2310 is in close contact with the chain 2520, and thus the chain 2520 may be bent by the first roller 2310 and simultaneously move in the first direction while being stably supported by the first roller 2310.

The structure of the first elastic part 2710 may also be employed by the display device for a vehicle which includes the support bar 2550.

Figure 18:
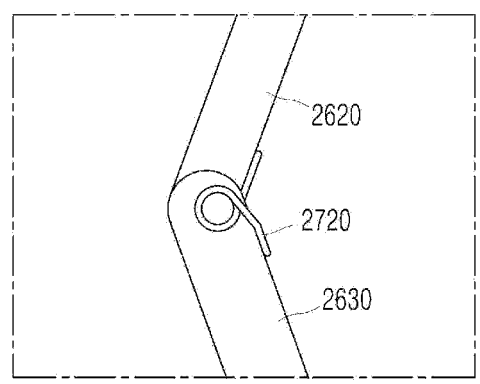
FIG. 18 is a view illustrating an example of a second elastic part.

The guider 2600 may further include a second elastic part 2720. FIG. 18 is a view illustrating an example of a second elastic part 2720.

The second elastic part 2720 is disposed in the coupling portion of the first control bar 2620 and the second control bar 2630 to elastically support the rotation of the first control bar 2620 and the second control bar 2630.

The second elastic part 2720, for example, may be provided as a torsion spring. The second elastic part 2720 may be mounted to pass through the coupling portion where the first control bar 2620 and the second control bar 2630 rotate with each other, and one end of the second elastic part 2720 is fixedly coupled to the first control bar 2620 and the other end is fixedly coupled to the second control bar 2630.

The second elastic part 2720 may be provided to apply a rotational force to the first control bar 2620 and the second control bar 2630 so as to increase an angle between the first control bar 2620 and the second control bar 2630.

Due to this structure, when the driver manually manipulates the display device for a vehicle to increase the externally exposed area of the flexible display 2400, a force for the first roller 2310 to smoothly ascend in the first direction may be provided to the display device for a vehicle.

Figure 19:
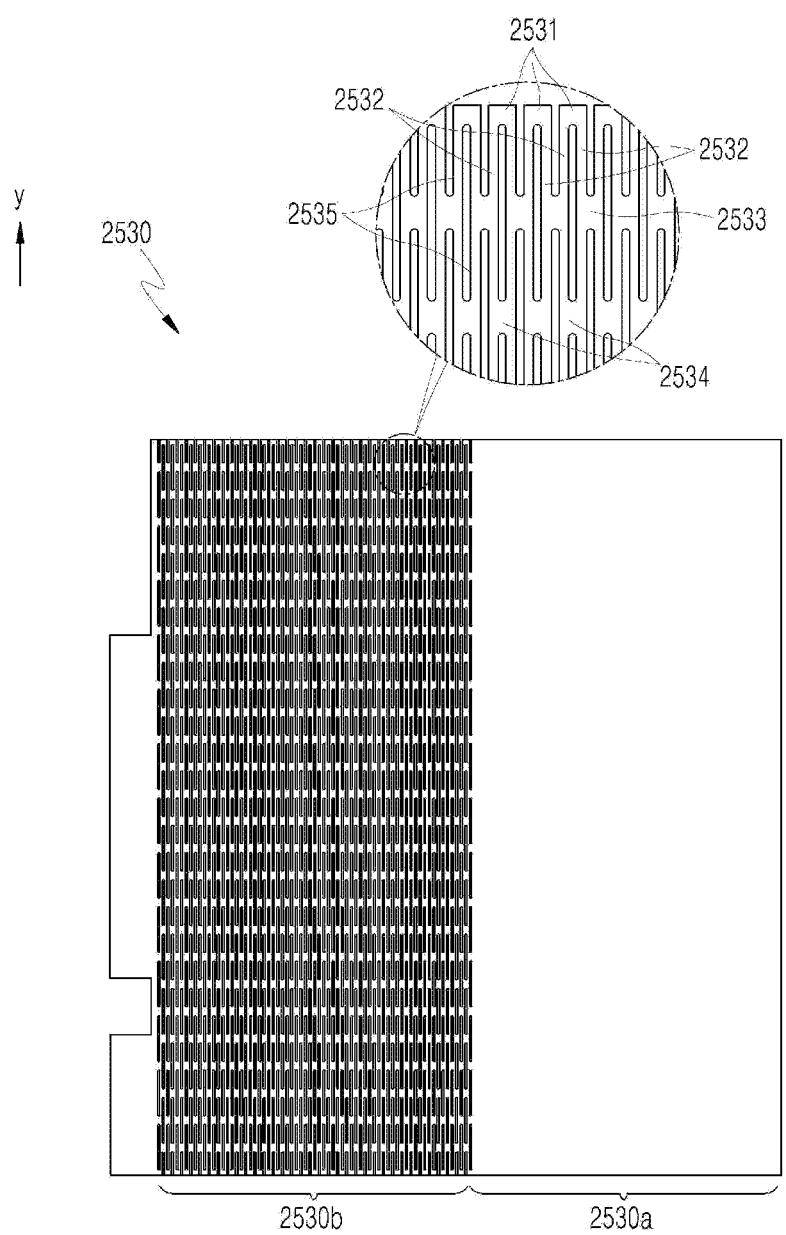
FIG. 19 is a view illustrating an example of a back plate.

FIG. 19 illustrates an example of a back plate 2530. The back plate 2530 may be formed of a metal plate having elasticity. For example, the back plate 2530 may be configured to include a super elastic metal.

The back plate 2530 may allow the flexible display 2400 to be smoothly elastically deformed and elastically restored.

The back plate 2530 may be formed as a relatively thin plate. For example, the back plate 2530 may be formed to have an arbitrary thickness within a range of 0.05 to 0.2 mm, and may be formed to have a thickness of 0.1 mm.

The back plate 2530 may be formed of an integrated metal plate as a whole and be divided into two or more areas. Specifically, the back plate 2530 may be configured to include a fixed area 2530a and a transformable area 2530b.

The fixed area 2530a overlaps a portion of the flexible display 2400 which is not bent. In the fixed area 2530a, the back plate 2530 may be formed as a flat metal plate as a whole.

Through holes 2535 may be formed in portion of the back plate 2530 which corresponds to the roller, that is, the transformable area 2530b. The transformable area 2530b overlaps a bending portion of the flexible display 2400. In the transformable area 2530b, a plurality of through holes 2535 are formed to be long in the width direction (left-right direction). That is, in the transformable area 2530b, a plurality of through holes which pass through the thickness direction is formed in the back plate 2530.

In the transformable area 2530b, the back plate 2530 may be formed to be symmetrical in the left-right direction. The transformable area 2530b in which the plurality of through holes 2535 are formed may include edges 2531, horizontal connectors 2532, and first vertical connectors 2533.

The edges 2531 are divided into a plurality of edges to form a left edge and a right edge of the back plate 2530. The edges 2531 have a predetermined length along the length direction, and are spaced apart from each other.

The horizontal connectors 2532 extend from the edges 2531 in the width direction. Two horizontal connectors 2532 extend from one edge 2531.

The first vertical connector connects two horizontal connectors 2532 which extend from different edges 2531 to each other. That is, one first vertical connector 2533 connects two horizontal connectors 2532 extending from two adjacent edges 2531 and are adjacent to each other. The first vertical connectors 2533 may be repeatedly formed along the width direction (left-right direction), and the first vertical connectors 2533 may be spaced apart from each other at regular intervals.

Second vertical connectors 2534 may be formed in the transformable area 2530b, and one second vertical connector 2534 connects two horizontal connectors 2532 extending from the same edge 2531. The second vertical connectors 2534 may be repeatedly formed along the width direction (left-right direction), and the second vertical connectors 2534 may be spaced apart from each other at regular intervals.

As described above, since the through holes 2535, which are long in the width direction, are repeatedly formed in the transformable area 2530b, the transformable area 2530b may be easily bent with respect to the rotation axis of the width direction.

When a tensile force, which is an external force, is applied to the transformable area 2530b along the length direction, the edges 2531 and the first vertical connectors 2533 may be deformed to be spaced apart from each other in the length direction with respect to the horizontal connectors 2532, and the length of the transformable area 2530b may be increased over the entire area of the transformable area 2530b. When the external force is removed, the transformable area 2530b is elastically recovered to its original state.

Further, when a tensile force, which is an external force, is applied to the transformable area 2530b along the length direction, the first vertical connectors 2533 and the second vertical connectors 2534 may be deformed to be spaced apart from each other in the length direction with respect to the horizontal connector 2532, and the length of the transformable area 2530b may be increased over the entire area of the transformable area 2530b. When the external force is removed, the transformable area 2530b is elastically recovered to its original state.

Since the back plate 2530 includes the transformable area 2530b, the bending area of the flexible display 2400 may be more flexibly deformed. When the flexible display 2400 is bent at a portion adjacent to the second roller 2320, the flexible display 2400 can easily be elastically deformed, and spring-back can easily be controlled.

Further, since the back plate 2530 includes the transformable area 2530b, the flexible display 2400 may be elastically deformed within a predetermined range along the length direction.

In some implementations, since the externally exposed area of the flexible display 2400 is manually adjusted by the user or automatically adjusted by the actuator 2650, the size of the screen to be displayed cab be adjusted in accordance with the convenience of the user.

The controller 180 provided in the above-described display device for a vehicle may control the operation of the display device for a vehicle such that the display device for a vehicle has an externally exposed area set by each user or based on characteristics of each device provided in the vehicle.

In some examples, the controller 180 may control the externally exposed area of the display device for a vehicle based on an input value of the user. For example, the user may input a numerical value for the externally exposed area of the display device for a vehicle to the input interface 120, the controller 180 may control the externally exposed area of the display device in accordance with the inputted numerical value so that the user may conveniently watch displayed images or information from a screen with a desired size.

In some examples, the flexible display 2400 may reproduce a screen for controlling devices provided in the vehicle, and the controller 180 may control the externally exposed area to be varied in accordance with the characteristics of the respective devices provided in the vehicle. The controller 180 may be configured to vary the externally exposed area of the flexible display 2400 based on a user of the vehicle or a content to be displayed in the flexible display 2400.

Specifically, the flexible display 2400 may reproduce a navigation screen, a screen for manipulating an air conditioner, and a screen for controlling a driving device to display a brake or a speedometer. For example, in order to allow the user such as a driver to conveniently and accurately recognize a destination and a current position of the vehicle, when the controller 180 reproduces the navigation screen, the controller 180 may control the display device for a vehicle such that the externally exposed area of the flexible display 2400 is increased as compared with other cases.

In some implementations, the controller 180 may recognize a face of the user which is in the driver's seat through a camera provided in the display device for a vehicle so as to identify the user and control the size of the externally exposed area of the flexible display 2400 based on a value set for each identified user. In some examples, the controller 180 may control the size of the externally exposed area of the flexible display 2400 based on information on the identified user. For instance, the controller 180 may control the size of the externally exposed area of the flexible display 2400 based on a height of the identified user or an eye level of the identified user. The information on the identified user may be preset by the user or may be detected by the sensor 140.

As described above in association with implementations, although some cases were described, other various implementations are possible. The technical contents of the implementations described above may be combined in various ways unless they are not compatible, so new implementations may be correspondingly implemented.

What is claimed is:

1. A display device for a vehicle, comprising:
   a first frame;
   a second frame configured to move along a first direction with respect to the first frame;
   a first roller spaced apart from the first frame;
   a second roller rotatably coupled to the second frame and configured to move along the first direction based on movement of the second frame with respect to the first frame;
   a flexible display that is at least partially wound around the second roller and that is configured to be bent around the second roller, the flexible display having an end portion fixed to the first frame;
   a moving part configured to move the second roller in the first direction; and
   a guider configured to guide movement of the moving part,
   wherein a front surface of the flexible display defines an externally exposed area that is configured to increase based on an increase of a distance between the first roller and the second roller,
   wherein the moving part comprises:
     a moving plate that has an end portion coupled to the second frame, the moving plate being configured to move along the first direction based on the second roller moving along the first direction, and
     a chain that has an end portion coupled to the moving plate, that is configured to be bent around the first roller, and that supports at least a part of a rear surface of the flexible display,
   wherein the chain comprises:
     a first link that defines a first link hole,
     a second link that defines a second link hole, and
     a link pin that is inserted into the first link hole and the second link hole and that connects the first link and the second link, and
   wherein the first link has an elongated slot shape having a first diameter in a length direction of the chain and a second diameter in a thickness direction of the chain, the first diameter being greater than the second diameter.

2. The display device according to claim 1, wherein the second frame comprises:
   a pair of bodies that are coupled to the second roller through a pin and that support both sides of the second roller; and a connection bar that connects the pair of bodies to each other and that is configured to guide the flexible display to contact the second roller.

3. The display device according to claim 1, wherein at least a part of the flexible display is configured to come in contact with the moving plate or the chain.

4. The display device according to claim 1, wherein the guider comprises:
a connector coupled to an end of the flexible display;
a first control bar that has a first end movably coupled to the connector, that is configured to move along the connector in a second direction perpendicular to the first direction, and that is configured to rotate based on the second roller moving along the first direction;
a second control bar that has a first end rotatably coupled to a second end of the first control bar and that is configured to rotate based on the second roller moving along the first direction; and
an internal plate that is disposed between the first control bar and the second control bar and that is fixed to the first frame, and
wherein a coupling portion of the first control bar and the second control bar passes through the internal plate.

5. The display device according to claim 4, further comprising:
a rack gear arranged at the moving plate along the first direction;
a pinion gear engaged with the rack gear; and
a motor configured to rotate the pinion gear.

6. The display device according to claim 5, wherein the moving plate is configured to, based on rotation of the pinion gear, move along the first direction, and
wherein the first control bar and the second control bar are configured to, based on the moving plate moving along the first direction, rotate about the coupling portion.

7. The display device according to claim 4, further comprising a first elastic part that is mounted at the internal plate, that is disposed at a position facing the first roller, and that is configured to elastically support the second roller.

8. The display device according to claim 4, wherein:
the connector defines a first slot that receives a first protrusion protruding from the first end of the first control bar, that extends in the second direction, and that is configured to guide movement of the first control bar along the connector in the second direction;
the internal plate defines a second slot that receives the coupling portion of the first control bar and the second control bar and that is configured to guide movement of the coupling portion; and
the chain defines a third slot that receives a second protrusion protruding from a second end of the second control bar, that extends in the second direction, and that is configured to guide movement of the second control bar along the chain in the second direction.

9. The display device according to claim 4, wherein the guider further comprises an elastic part that is disposed at the coupling portion and that is configured to elastically support the first control bar and the second control bar.

10. The display device according to claim 1, wherein the first frame is configured to be fixed to a dashboard of the vehicle, and
wherein the flexible display is configured to protrude outward from the dashboard of the vehicle based on the second frame moving along the first direction with respect to the first frame.

11. The display device according to claim 1, further comprising a guide bar that is fixed to the first frame, that extends in the first direction, and that defines a guide rail,
wherein the second frame comprises a protruding portion that is coupled to the guide rail.

12. The display device according to claim 1, further comprising:
a magnet fixed to the second frame;
a hall sensor fixed to the first frame and configured to sense a distance between the magnet and the hall sensor; and
a controller configured to determine the externally exposed area of the flexible display based on the distance between the magnet and the hall sensor.

13. The display device according to claim 12, wherein the controller is configured to vary the externally exposed area of the flexible display based on a user of the vehicle or a content to be displayed in the flexible display.

14. A display device for a vehicle, comprising:
a first frame;
a second frame configured to move along a first direction with respect to the first frame;
a first roller spaced apart from the first frame;
a second roller rotatably coupled to the second frame and configured to move along the first direction based on movement of the second frame with respect to the first frame;
a flexible display that is at least partially wound around the second roller and that is configured to be bent around the second roller, the flexible display having an end portion fixed to the first frame;
a moving part configured to move the second roller in the first direction; and
a guider configured to guide movement of the moving part,
wherein a front surface of the flexible display defines an externally exposed area that is configured to increase based on an increase of a distance between the first roller and the second roller,
wherein the moving part comprises:
a moving plate that has an end portion coupled to the second frame, the moving plate being configured to move along the first direction based on the second roller moving along the first direction, and
a chain that has an end portion coupled to the moving plate, that is configured to be bent around the first roller, and that supports at least a part of a rear surface of the flexible display, and
wherein the display device further comprises a third roller that is rotatably coupled to the second frame and that supports the flexible display to allow a part of the flexible display to be in contact with the moving plate.

15. The display device according to claim 14, wherein the third roller is configured to move along the first direction together with the second roller based on the second roller moving along the first direction.

16. A display device for a vehicle, comprising:
a first frame;
a second frame configured to move along a first direction with respect to the first frame;
a first roller spaced apart from the first frame;
a second roller rotatably coupled to the second frame and configured to move along the first direction based on movement of the second frame with respect to the first frame;
a flexible display that is at least partially wound around the second roller and that is configured to be bent around the second roller, the flexible display having an end portion fixed to the first frame;

a moving part configured to move the second roller in the first direction; and a guider configured to guide movement of the moving part, wherein a front surface of the flexible display defines an externally exposed area that is configured to increase based on an increase of a distance between the first roller and the second roller, wherein the moving part comprises:

a moving plate that has an end portion coupled to the second frame, the moving plate being configured to move along the first direction based on the second roller moving along the first direction, and a chain that has an end portion coupled to the moving plate, that is configured to be bent around the first roller, and that supports at least a part of a rear surface of the flexible display, wherein the guider comprises:

a connector coupled to an end of the flexible display, a first control bar that has a first end movably coupled to the connector, that is configured to move along the connector in a second direction perpendicular to the first direction, and that is configured to rotate based on the second roller moving along the first direction, a second control bar that has a first end rotatably coupled to a second end of the first control bar and that is configured to rotate based on the second roller moving along the first direction, and an internal plate that is disposed between the first control bar and the second control bar and that is fixed to the first frame, and wherein a coupling portion of the first control bar and the second control bar passes through the internal plate.

\* \* \* \* \*